United States Patent
Kato

(10) Patent No.: US 7,270,883 B2
(45) Date of Patent: Sep. 18, 2007

(54) FILM-FORMING COMPOSITION, ANTI-REFLECTION FILM, POLARIZING PLATE, IMAGE DISPLAY APPARATUS, ANTI-POLLUTION COATING COMPOSITION AND ANTI-POLLUTION ARTICLE

(75) Inventor: Eiichi Kato, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 463 days.

(21) Appl. No.: 10/912,309

(22) Filed: Aug. 6, 2004

(65) Prior Publication Data

US 2005/0053790 A1    Mar. 10, 2005

(30) Foreign Application Priority Data

Sep. 3, 2003    (JP)    ............... 2003-311491

(51) Int. Cl.
*B32B 7/00*    (2006.01)
*B32B 27/00*    (2006.01)

(52) U.S. Cl. ............. 428/421; 428/212; 428/447; 347/44; 347/45; 347/46; 347/47

(58) Field of Classification Search ............ 428/421, 428/447, 212; 347/44, 45, 46, 47
See application file for complete search history.

(56) References Cited

U.S. PATENT DOCUMENTS 5,010,356 A * 4/1991 Albinson .................. 347/45
6,302,523 B1 * 10/2001 Smith et al. ............. 347/45

FOREIGN PATENT DOCUMENTS

| JP | 56-28219 | 3/1981 |
|----|----------|--------|
| JP | 8-122502 | 5/1996 |
| JP | 8-234002 | 9/1996 |
| JP | 11-209685 | 8/1999 |
| JP | 2000-313709 | 11/2000 |
| JP | 2001-200019 | 7/2001 |
| JP | 2001-272504 | 10/2001 |
| WO | 98/29505 | 7/1998 |

* cited by examiner

*Primary Examiner*—Rena Dye
*Assistant Examiner*—Lawrence D. Ferguson
(74) *Attorney, Agent, or Firm*—Buchanan Ingersoll & Rooney PC

(57) ABSTRACT

A film-forming composition comprising (a) a block copolymer that comprises: at least a polymer block [A] containing a specific fluorine-containing alicyclic structure; at least a polymer block [B] containing a specific siloxane structure; and a repeating unit (H) having at least one reactive group capable of being involved in crosslinking reaction, the repeating unit (H) being in at least one of the polymer block [A] and the polymer block [B], and (b) at least one of a curing agent and a curing accelerator.

14 Claims, No Drawings

FILM-FORMING COMPOSITION, ANTI-REFLECTION FILM, POLARIZING PLATE, IMAGE DISPLAY APPARATUS, ANTI-POLLUTION COATING COMPOSITION AND ANTI-POLLUTION ARTICLE

BACKGROUND OF THE INVENTION

1. Field of the Invention

The present invention relates to a film-forming composition, an anti-reflection film using the film-forming composition, a polarizing plate and an image display apparatus (particularly a liquid crystal display) using the anti-reflection film.

The present invention also relates to a coating composition for an anti-pollution article excellent in an anti-pollution function by water repellency and oil repellency, and an anti-pollution article having a cured film of the coating composition. In particular, the present invention relates to a coating composition for an anti-pollution article capable of forming anti-pollution layers on the surfaces of optical members (e.g., an anti-reflection film, a polarizing plate, an optical filter, an optical lens, a liquid crystal display, a CRT display, a projection television, a plasma display, an EL display and the like) without impairing the optical performances of various optical members, and relates to an anti-pollution article having a cured film comprising the coating composition.

2. Description of the Related Art

An anti-reflection film is generally arranged on the surface of an optical product to reduce reflectance by using the principle of optical interference for the purpose of preventing the reduction of contrast and mirroring of images by the reflection of outer light, in particular, in image display apparatuses such as cathode-ray tube (CRT), plasma display panel (PDP) and liquid crystal display (LCD) which are required to have good visibility, the film is arranged on the outermost surface of the display.

These anti-reflection films are generally manufactured in many cases by forming a low refractive index layer having an appropriate thickness on a high refractive index layer. As the materials for a low refractive index layer, materials having the lowest possible refractive index are desired from the viewpoint of the property of anti-reflection, and at the same time, high scratch resistance and an anti-pollution property are required, since it is used on the outermost surface of an image display apparatus. For reducing reflectance, the uniformity of film thickness is important, and a coating property and a leveling property are also important factors in coating type materials.

On the other hand, base materials such as metals, glass and resins are conventionally widely used as the parts of motor vehicles, office automation equipments and household electrical appliances and the like, but the surfaces of these base materials are polluted by the adhesion of floating dusts in cars, offices and rooms, by the adhesion of oily substances contained in foods and machine oils difficult to be wiped out, and the adhesion of fingerprints during use. Accordingly, various means are adopted to make dirt difficultly adhere to the surfaces of base materials and contrivances concerning scratch resistance and an anti-pollution property are taken so as to easily remove once adhered dirt without scratching the surfaces.

Particularly in optical members, such as anti-reflection films, polarizing plates, optical filters, optical lenses and image display apparatuses, fingerprints, sebaceous matters, sweat and cosmetics are often adhered by the use. Such dirt once adhered cannot be removed easily and in particular optical members with anti-reflection films show adhered dirt, which is a problem.

As means to improve an anti-pollution property and scratch resistance while maintaining low refractive index, it is effective to impart a sliding property to the surfaces of optical members, e.g., the addition of fluorine compounds and silicone compounds. These means lower surface tension and are also expected to be effective to give a leveling property. As fluorine-containing polymers that are low refractive index compounds, fluorine-containing olefin copolymers reveal extremely high water repellency, oil repellency and show good anti-pollution property by $-CF_2-$ groups or $-CF_3$ groups orientated on the surfaces of films, but they are hardly soluble in solvents, so that it is difficult to obtain membranes by coating.

In regard to this subject, methods of improving a coating property by introducing polysiloxane components are disclosed, such as a fluorine-containing olefin copolymer introduced thereto a polysiloxane block copolymer component by a silicone macro-azo initiator (JP-A-2000-313709), a polymer reaction of a fluorine-containing olefin copolymer containing an epoxy group with polysiloxane containing an amino group (JP-A-56-28219), and a polymer reaction of a perfluoroolefin copolymer containing a hydroxyl group with polysiloxane containing an epoxy group (WO 98/29505).

Film uniformity is greatly improved by these methods but the orientation of the main chain of perfluoroolefin polymer on the outermost surface of the film after being cured becomes insufficient, as a result an anti-pollution property lowers or the film is deteriorated by the use for a long period of time.

Further, low refractive index layers comprising a cured polymer film having an alicyclic structure containing fluorine-containing hetero atoms which are well soluble in specific fluorine solvents are disclosed (JP-A-8-122502, JP-A-11-209685 and JP-A-8-234002) but these layers cannot satisfy required abrasion resistance. Cured film using a copolymer having a perfluoro alicyclic structure not containing hetero atoms are also supposed (JP-A-2001-200019 and JP-A-2001-272504).

SUMMARY OF THE INVENTION

On the other hand, with the tendency of widening of image display apparatuses or the progress of mobilization of displays, requirements for sharpness of displayed images, durability of protective films (scratch resistance and weatherproofness) and anti-pollution have increased. In particular, it is required that fingerprints, sebaceous matters, sweat and cosmetics adhered by hand touch be easily wiped out and an anti-pollution property be maintained even by use for a long period of time.

Accordingly, an object of the present invention is to provide a film-forming composition excellent in scratch resistance and an anti-pollution property and capable of forming a uniform film.

Another object of the present invention is to provide an anti-reflection film excellent in anti-reflection, scratch resistance and pollution prevention, and a polarizing plate and an image display apparatus using the anti-reflection film.

A further object of the invention is to provide a coating type anti-reflection film suitable for mass production.

A still further object of the invention is to provide an image display apparatus equipped with an anti-pollution film excellent in anti-reflection, pollution prevention, durability and weatherproofness.

A yet further object of the invention is to provide a coating composition for an anti-pollution article excellent in an anti-pollution property, durability and scratch resistance, and to provide an anti-pollution article.

A still yet further object of the invention is to provide a polarizing plate and an image display apparatus excellent in scratch resistance and an anti-pollution property and further having an anti-reflection property.

The above various objects can be achieved by the following constitutions.

(1) A film-forming composition comprising: a block copolymer comprising:

at least one polymer block [A] containing a repeating unit (F), the repeating unit (F) containing at least one of fluorine-containing alicyclic structures represented by formula (FI) and formula (FII);

at least one polymer block [B] containing a repeating unit (S), the repeating unit (S) containing at least one group selected from the siloxane structure groups represented by formula (SI); and a repeating unit (H) having at least one reactive group capable of being involved in crosslinking reaction, the repeating unit (H) being in at least one of the polymer block [A] and the polymer block [B]; and at least one of a curing agent and a curing accelerator;

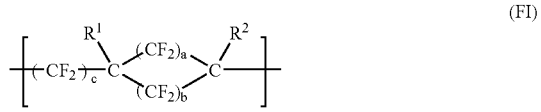

(FI)

wherein $R^1$ and $R^2$, which are the same or different, each represents a fluorine atom or a —$C_jF_{2j+1}$ group; j represents an integer of from 1 to 4; a represents 0 or 1; b represents an integer of from 2 to 5; and c represents 0 or 1;

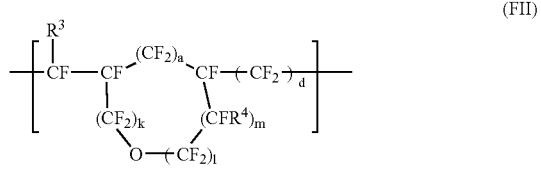

(FII)

wherein $R^3$ and $R^4$ each represents a fluorine atom or a —$CF_3$ group; a represents the same number as in formula (FI); d represents 0 or 1; k represents 0 or an integer of from 1 to 5; l represents 0 or an integer of from 1 to 4; m represents 0 or 1; and (k+l+m) is an integer of from 1 to 6;

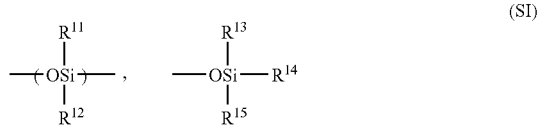

(SI)

wherein $R^{11}$, $R^{12}$, $R^{13}$, $R^{14}$ and $R^{15}$, which are the same or different, each represents an aliphatic group or an aromatic group.

(2) An anti-reflection film comprising a low refractive index layer, wherein the low refractive index layer is formed by coating and curing an film-forming composition as described in the above item (1).

(3) The anti-reflection film as described in the above item (2), wherein the low refractive index layer contains inorganic compound fine particles having an average primary particle size of 3 to 50 nm and a refractive index of 1.5 or less.

(4) The anti-reflection film as described in the above item (2) or (3), further comprising a transparent substrate.

(5) The anti-reflection film as described in any of the above item (4), further comprising: at least one high refractive index layer having a higher refractive index than that of the transparent substrate, said at least one high refractive index layer being between the low refractive index layer and the transparent substrate.

(6) The anti-reflection film as described in the above item (5), wherein said at least one high refractive index layer comprises two layers having different refractive indexes and each of the two layers has a refractive index of 1.50 to 2.50.

(7) The anti-reflection film as described in the above item (4), further comprising:

at least one anti-glare layer having a higher refractive index than that of the transparent substrate, said at least one anti-glare layer being between the low refractive index layer and the transparent substrate.

(8) The anti-reflection film as described in the above item (5) or (6), further comprising a hard coat layer between the transparent substrate and said at least one high refractive index layer.

(9) The anti-reflection film as described in the above item (7), further comprising a hard coat layer between the transparent substrate and said at least one anti-glare layer.

(10) A polarizing plate comprising: a polarizing film; and an anti-reflection film as described in any of the above items (4) to (9) as a protective film of at least one side of the polarizing film.

(11) A polarizing plate comprising: a polarizing film; an optical compensation film having an optical anisotropy as a protective film of one side of the polarizing film; and the anti-reflection film as described in any of the above items (4) to (9) as a protective film of the other side of the polarizing film.

(12) An image display apparatus comprising:
one of (a) an anti-reflection film according to claim 4 and (b) a polarizing plate according to claim 10 which is on the side of an image display face of the image display apparatus.

(13) A coating composition for an anti-pollution article, comprising a film-forming composition as described in the above item (1).

(14) An anti-pollution article having a film, the film being formed by coating and curing a coating composition for an anti-pollution article as described in the above item (13).

The film-forming composition according to the present invention comprises a block copolymer containing at least the following 1) and 2).

1) Block [A] having at least one fluorine-containing alicyclic structure represented by the above formula (FI) or (FII) in the repeating unit (F), i.e., block [A] containing, a polymer component (F) having a perfluoro alicyclic structure which may contain an oxygen atom as the main component.

2) block [B] having at least one group selected from the siloxane structure groups represented by the above formula (SI) in the repeating unit (S), i.e., block [B] containing a polymer component (S) having a siloxane structure as the main component.

Further, the block copolymer contains the following 3) in block [A] or block [B].

3) A repeating unit (H) having at least one reactive group capable of being involved in crosslinking reaction. Repeating unit (H) is contained in at least either block of block [A] or block [B] as a polymer component (H).

The film-forming composition according to the present invention is a curable polymer containing the above block copolymer and the following 4), and forms a film by curing.

4) At least one of a curing agent and a curing accelerator.

It has been confirmed that a film obtained by the film-forming composition of the invention and an article provided with the film can reconcile an anti-pollution property and scratch resistance. This is presumably due to the fact that the resin comprising both blocks (block [A] and block [B]) having high water repellency and oil repellency is subjected to coating and drying processes, thereby polymer component (F) having a perfluoro alicyclic structure contained in block [A] comes to be locally present on the surface side, and the resin is sufficiently cured in that state and higher-order structure is formed by the intermolecular crosslinking of the polymers by component (H), and this is one of main factors.

The anti-reflection film of the invention has a low refractive index layer obtained by coating and curing the above film-forming composition as the outermost layer.

The anti-reflection film obtained by the invention has optically uniform characteristics (reflectance and an anti-glare property) all over the film and is free of optical defects and excellent in visibility. The reason for this is probably that the copolymer of the invention has a low refractive index capable of sufficiently satisfying the low refractive index as the low refractive index layer of the anti-reflection film, and the resin contains sufficient chlorine to satisfy the low refractive index property but has excellent characteristics to show good solubility in an organic solvent, so that a thin film can be obtained by uniform coating property.

DETAILED DESCRIPTION OF THE INVENTION

The film-forming composition, anti-reflection film, polarizing plate and image display apparatus according to the invention are described in detail below. In the specification of the invention, the description "from (numerical value 1) to (numerical value 2)" means "(numerical value 1) or more and (numerical value 2) or less".

Film-Forming Composition:

Each component contained in the film-forming composition of the invention is described below.

Block Copolymer (BP):

Block copolymer (BP) in the invention contains block [A] and block [B], further component (H) in at least either block of block [A] or block [B]. As the block copolymers, either block copolymers of linearly bonding block [A] and block [B] (AB type and ABA type and the like), or block copolymers of bonding copolymers in graft-like may be used. Of these block copolymers, graft type block copolymers are preferred.

Fluorine-Containing Alicyclic Structures (FI) and (FII):

Fluorine-containing alicyclic structures for use in the invention are represented by the following formulae (FI) and (FII). In block copolymer (BP) of the invention, at least either structure of the following formulae (FI) and (FII) is contained in the later-described repeating unit (F).

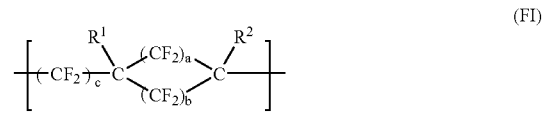

wherein $R^1$ and $R^2$, which may be the same or different, each represents a fluorine atom or a $-C_jF_{2j+1}$ group; j represents an integer of from 1 to 4; a represents 0 or 1; b represents an integer of from 2 to 5; and c represents 0 or 1. When a and/or c represent(s) 0, each represents a single bond.

In formula (FI), $R^1$ and $R^2$ may be the same or different, and each preferably represents a fluorine atom, a $-CF_3$ group or a $-C_2F_5$ group.

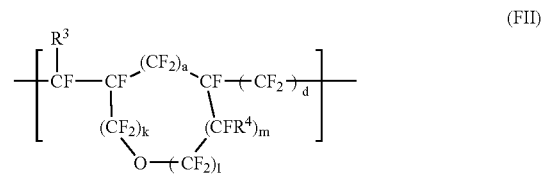

wherein $R^3$ and $R^4$ each represents a fluorine atom or a $-CF_3$ group; a represents the same number as in formula (FI); d represents 0 or 1; k represents 0 or an integer of from 1 to 5; l represents 0 or an integer of from 1 to 4; m represents 0 or 1; when d, k, l and/or m represent(s) 0, each represents a single bond, and (k+l+m) is an integer of from 1 to 6

The specific examples of fluorine-containing alicyclic structures represented by formulae (FI) and (FII) are shown below.

-continued

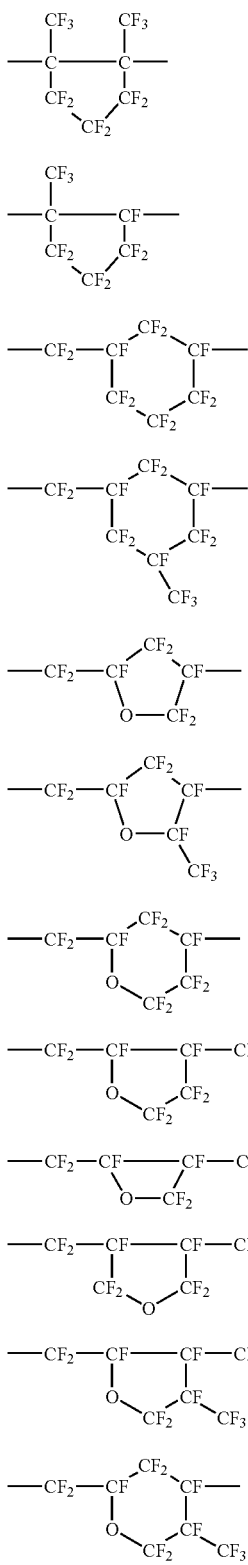

Siloxane Structure Groups (SI):

Siloxane structure groups for use in the invention are represented by the following formula (SI). In block copolymer (BP) of the invention, at least any structure of the following (SI) is contained in the later-described repeating unit (S).

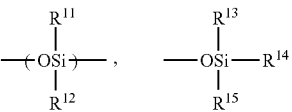

(SI)

wherein $R^{11}$ to $R^{15}$, which may be the same or different, each represents an aliphatic group or an aromatic group.

Block Copolymer (BP)— Graft Type Block Copolymer:

As described above, block copolymer (BP) in the invention is preferably a block copolymer in which block [A] and block [B] are bonded in graft type. As graft type block copolymer, a BPF type block copolymer with block [A] as the main chain of the polymer (hereinafter also referred to as block copolymer (BPF)), and a BPS type block copolymer with block [B] as the main chain of the polymer (hereinafter also referred to as block copolymer (BPS)) are exemplified as shown below.

BPF type:the main chain of the polymer is fluorine-containing component

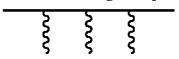

BPS type:the main chain of the polymer is siloxane-containing component ( ∿∿∿ :Block [A] ——— :Block [B])

The mass average molecular weight of block copolymer (BP) in the invention is preferably from $1 \times 10^4$ to $5 \times 10^5$, more preferably from $2 \times 10^4$ to $1 \times 10^5$.

The mass average molecular weight of the graft moiety is preferably from $1 \times 10^3$ to $2 \times 10^4$, more preferably from $3 \times 10^3$ to $1.5 \times 10^4$.

Block [A] and Block [B] in Block Copolymer (BPF):

Block copolymer (BPF) contains block [A] as the main chain of the polymer and block [B] as the graft moiety.

In block copolymer (BPF), as repeating unit [F] contained in block [A], the structure represented by formula (FI) or (FII) is exemplified. As the specific examples of the structures, the same specific examples as described above are exemplified.

In block copolymer (BPF), as repeating unit [S] contained in block [B], the structures represented by the following formulae (BPF-SIIa) and (BPF-SIIb) are specifically exemplified.

(BPF-SIIa)

$$-\left(\begin{array}{c}a^{11}\\|\\C-\\|\\a^{12}\end{array}\begin{array}{c}a^{13}\\|\\C\\|\\X^1\end{array}\right)-L^1-\left(SiO\right)_p-\begin{array}{c}R^{11}\\|\\Si\\|\\R^{12}\end{array}-R^{14}$$

-continued (BPF-SIIb)

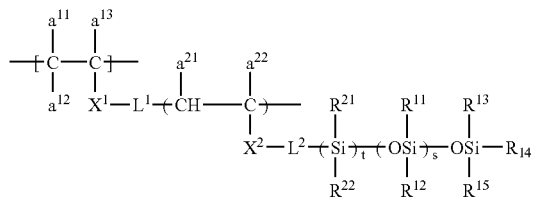

The following structural moiety (formula (I)) in formulae (BPF-SIIa) and (BPF-SIIb) is the same content as above.

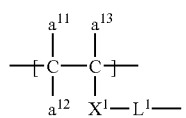
(I)

In formula (I), $X^1$ represents —O—, —OCO—, —COO—, —CONH—, or the following groups; and q represents an integer of from 1 to 12. These groups may further have a substituent.

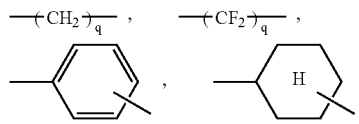

$L^1$ represents a divalent linking group linking -$X^1$- and a repeating unit containing a siloxane structure, or a direct bond. Specifically, $L^1$ consists of arbitrary combination of the atomic groups of the groups having the structures shown below, divalent alicyclic groups (as hydrocarbon rings having alicyclic structures, e.g., a cycloheptane ring, a cyclohexane ring, a cyclooctane ring, a bicyclopentane ring, a tricyclohexane ring, a bicyclooctane ring, a bicyclononane ring, a tricyclodecane ring), and divalent aryl cyclic groups (as aryl rings, e.g., a benzene ring, a naphthalene ring).

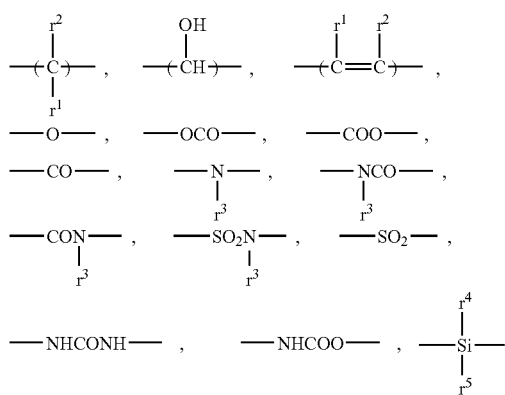

In the above formulae, $r^1$ and $r^2$, which may be the same or different, each represents a hydrogen atom, a halogen atom (e.g., fluorine, chlorine, bromine, iodine), or an alkyl group having from 1 to 6 carbon atoms which may be substituted (e.g., methyl, ethyl, propyl, butyl, pentyl, hexyl, trifluoromethyl, methoxyethyl, cyanoethyl, chloroethyl); $r^3$ represents a hydrogen atom, or a hydrocarbon group having from 1 to 12 carbon atoms which may be substituted (e.g., methyl, ethyl, propyl, butyl, hexyl, cyclohexyl, cyclohexylmethyl, benzyl, phenethyl, phenyl, chlorophenyl, methoxyphenyl, acetylphenyl, trifluorophenyl); $r^4$ and $r^5$, which may be the same or different, each represents a hydrocarbon group having from 1 to 12 carbon atoms which may be substituted (specifically the same content as $r^3$)

In formula (I), the total number of atoms excluding hydrogen atom of the linking group represented by [—$X^1$—$L^1$—] is preferably from 1 to 20, more preferably from 4 to 8. Curing reaction rapidly progresses and sufficient film strength can be retained in this range of carbon atom number.

$a^{11}$, $a^{12}$ and $a^{13}$, which may be the same or different, each represents a hydrogen atom, a fluorine atom, or an alkyl group having from 1 to 6 carbon atoms which may be substituted (e.g., methyl, ethyl, propyl, butyl, methoxycarbonylmethyl, ethoxy-carbonylmethyl, propoxycarbonylmethyl).

As the group represented by the following structural moiety (formula (II)) excluding [—$X^1$—$L^1$—] in formula (I), the groups exemplified below are preferred.

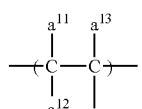
(II)

Preferred groups represented by formula(II)

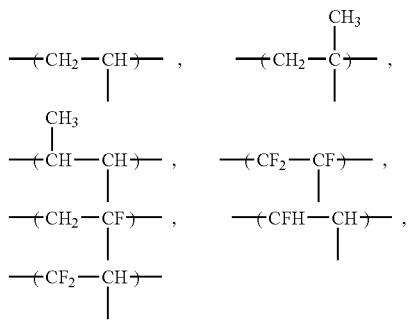

The siloxane structure in formula (BPF-SIIa), i.e., the structure represented by the following formula (BPF-SIIa)', is described.

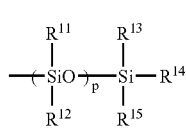
(BPF-SIIa)' wherein $R^{11}$ and $R^{12}$, which may be the same or different, each represents an aliphatic group having from 1 to 12 carbon atoms which may be substituted, or an aryl group having from 6 to 14 carbon atoms which may be substituted.

As the aliphatic groups, a straight chain or branched alkyl group having from 1 to 12 carbon atoms (e.g., methyl, ethyl, propyl, butyl, pentyl, hexyl, octyl, decyl, dodecyl), a straight chain or branched alkenyl group having from 2 to 12 carbon atoms (e.g., vinyl, propenyl, butenyl, pentenyl, hexenyl, octenyl, decenyl, dodecenyl), a straight chain or branched alkynyl group having from 3 to 12 carbon atoms (e.g., propynyl, butynyl, cyclohexynyl, octynyl), an aralkyl group having from 7 to 12 carbon atoms (e.g., benzyl, phenethyl, 3-phenylpropyl, naphthylmethyl, 2-naphthylethyl), and an alicyclic group having from 5 to 12 carbon atoms (e.g., cyclopentyl, cyclohexyl, cyclooctyl, tricyclodecyl, bicyclooctyl, tricyclododecyl) are exemplified.

As the aryl groups, phenyl, naphthyl and anthracenyl are exemplified. These aliphatic groups and aryl groups may have a substituent, and they are not limited so long as they are residues of monovalent nonmetal atoms excluding a hydrogen atom. As the examples of substituents, a fluorine atom and an alkoxyl group (e.g., methoxy, ethoxy, propoxy) are preferred.

As $R^{11}$ and $R^{12}$, a methyl group, an ethyl group, a cyclohexyl group, a trifluoromethyl group, a 2,2,2-trifluoroethyl group, a benzyl group and a phenyl group are preferred.

p represents an integer of from 10 to 500, preferably from 50 to 300, and particularly preferably from 100 to 250. Different $R^{11}$ and/or $R^{12}$ may be mixed in n-pieces of —Si($R^{11}$)($R^{12}$)—O—.

$R^{13}$, $R^{14}$ and $R^{15}$, which may be the same or different, each represents a monovalent organic group, preferably an alkyl group having from 1 to 10 carbon atoms (e.g., methyl, ethyl, octyl), an alkoxyl group having from 1 to 10 carbon atoms (e.g., methoxy, ethoxy, propyloxy), or an aryl group having from 6 to 20 carbon atoms (e.g., phenyl, naphthyl), particularly preferably an alkyl group having from 1 to 5 carbon atoms. These groups may further have a substituent.

The specific examples of [—$X^1$—$L^1$—(BPF-SIIa)'] in formula (BPF-SIIa) are shown below, but the present invention is not limited thereto.

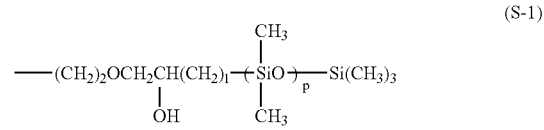

(S-1)

l: an integer of from 2 to 10

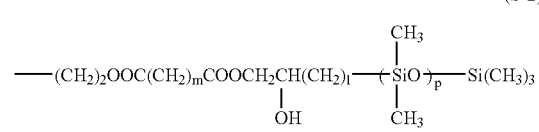

(S-2)

m: an integer of from 2 to 6

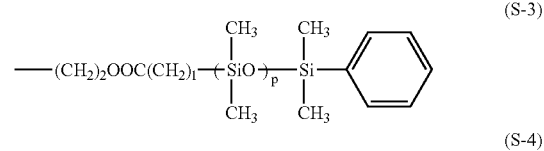

(S-3)

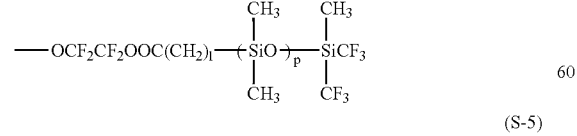

(S-4)

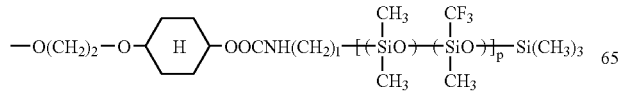

(S-5)

(S-6)

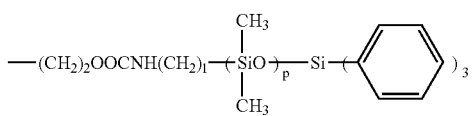

(S-7)

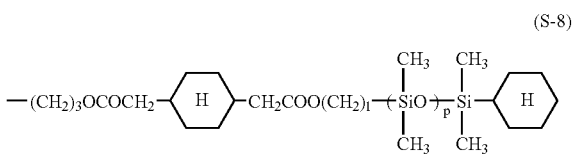

(S-8)

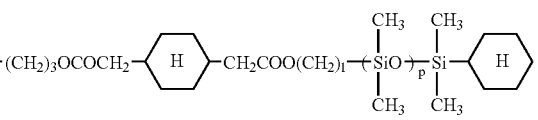

(S-9)

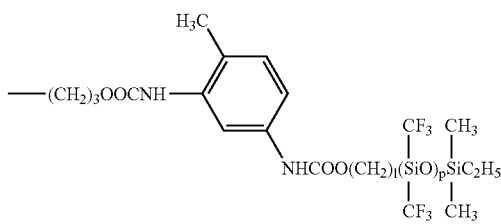

(S-10)

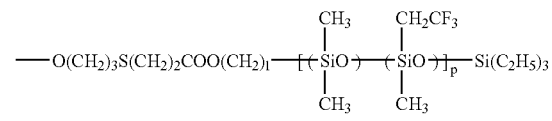

(S-11)

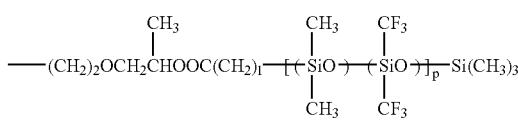

(S-12)

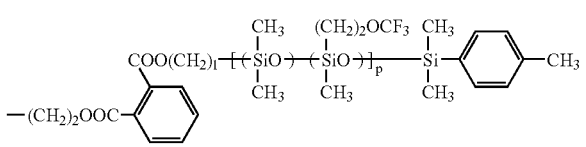

(S-13)

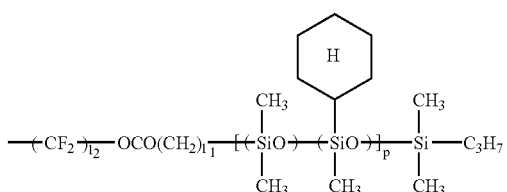

$l_1$: an integer of from 2 to 12
$l_2$: an integer of from 1 to 4

-continued (S-14)
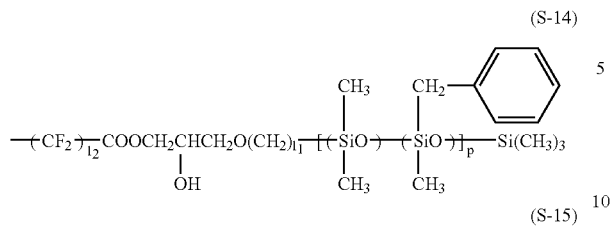

(S-15)
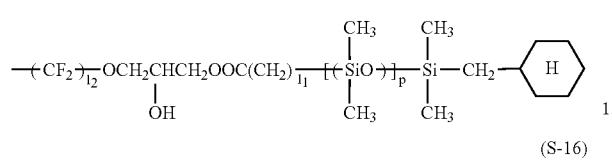

(S-16)
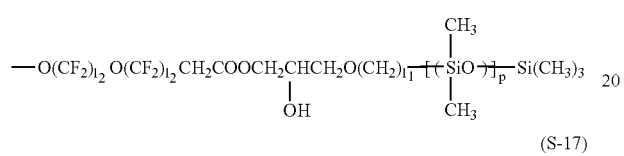

(S-17)
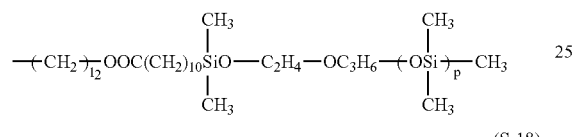

(S-18)
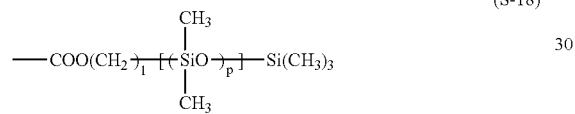

(S-19)
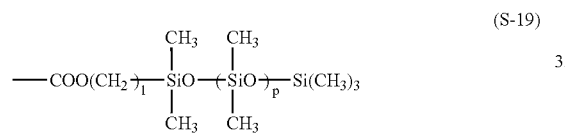

(S-20)
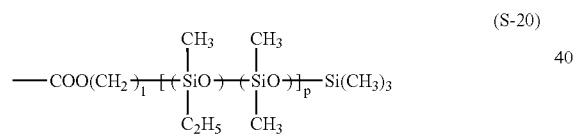

(S-21)

The structure represented by formula (BPF-SIIb) is described below. This structure is characterized in that the terminal of the main chain of ethylenic polymer containing siloxane structure represented by the following formula (SIIb) as the substituent of the side chain (formula (BPF-SIIb)) is bonded to formula (I). This ethylenic polymer moiety is contained in a mass average molecular weight of from $1 \times 10^3$ to $2 \times 10^4$ mol, more preferably from $3 \times 10^3$ to $1.5 \times 10^4$ mol.

(SIIb)
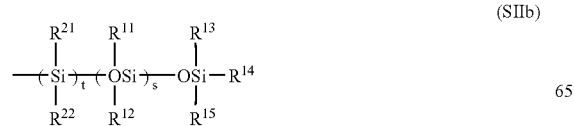

-continued (BPF-SIIb)'
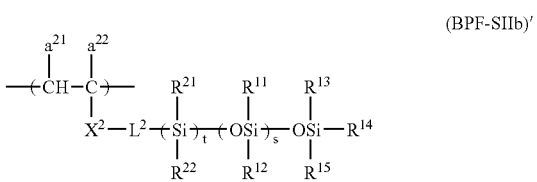

In formulae (BPF-SIIb) and (BPF-SIIb)', $a^{21}$ and $a^{22}$ each represents a hydrogen atom, a halogen atom (e.g., chlorine, bromine), a cyano group, an alkyl group having from 1 to 4 carbon atoms (e.g., methyl, ethyl, propyl, butyl), or a —CH$_2$COOR$^{30}$ group (R$^{30}$ represents an alkyl group having from 1 to 4 carbon atoms), preferably a hydrogen atom or a methyl group.

$X^2$ represents —COO—, —OCO—, —CONH—, —O—, —(CH$_2$)$_l$ (l is an integer of 1 or 2), or the following group.

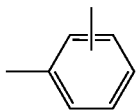

$L^2$ has the same meaning as $L^1$ in formula (BPF-SIIa)

$R^{11}$, $R^{12}$, $R^{13}$, $R^{14}$ and $R^{15}$ have the same meaning as in formula (BPF-SIIa).

$R^{21}$ and $R^{22}$, which may be the same or different, each has the same meaning as $R^{11}$ to $R^{15}$, or represents —OSi (R$^{13}$) (R$^{14}$) (R$^{15}$)

s represents 0 or an integer of from 1 to 8, and t represents 0 or 1.

The specific examples of (BPF-SIIb)' are shown below, but the invention is not limited thereto.

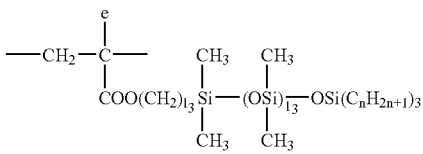

e: —H, —CH$_3$
l$_3$: an integer of from 2 to 6
l$_4$: 0 or an integer of from 1 to 10
n: an integer of from 1 to 4

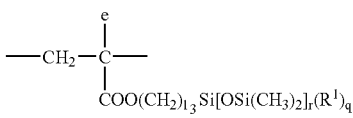

$R^1$: —C$_n$H$_{2n+1}$, —R$_f$
$R_f$: —CF$_3$, —C$_2$F$_5$, —CH(CF$_3$)$_2$
r + q = 3
r, q: 0 or an integer of from 1 to 3

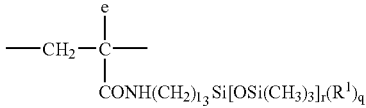

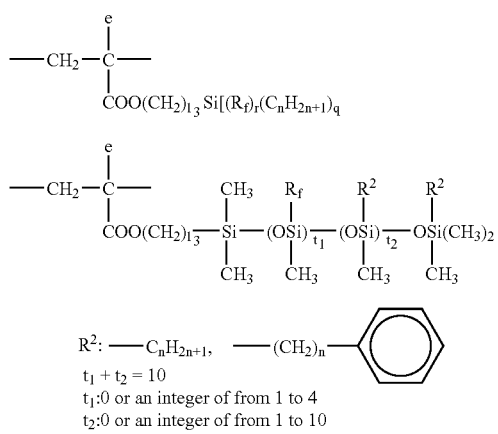

Block [A] and Block [B] in Block Copolymer (BPS):

Block copolymer (BPS) contains block [B] as the polymer main chain moiety and block [A] as the graft moiety.

In block copolymer (BPS), the structures represented by the following formulae (BPS-FI) and (BPS-FII) are exemplified as the repeating unit (F) contained in block [A].

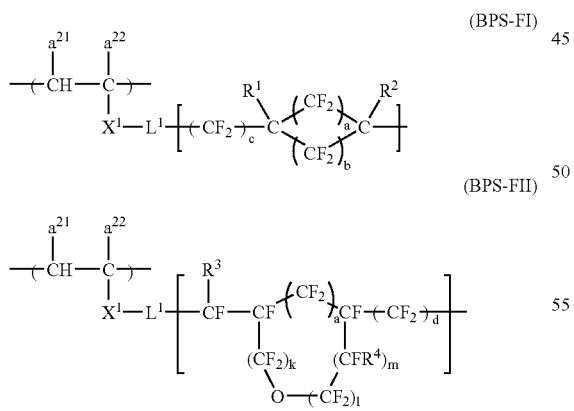

Each symbol in formulae (BPS-FI) and (BPS-FII) is the same as each symbol in formulae (FI), (FII) and (BPF-SIIb) described above.

In block copolymer (BPS), the structure represented by the following formula (BPS-SII) is exemplified as the repeating unit (S) contained in block [B].

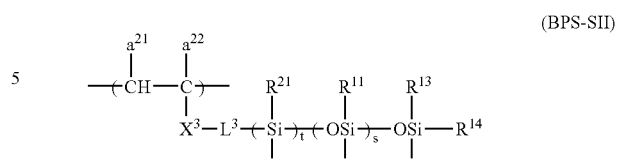

In formula (BPS-SII), $a^{21}$, $a^{22}$, $R^{11}$ to $R^{15}$, $R^{21}$, $R^{22}$, s and t represent the same contents as in formulae (BPF-SIIb) and (BPF-SIIb)' described above.

$X^3$ and $L^3$ each represents the same content as $X^2$ and $L^2$ in formulae (BPF-SIIb) and (BPF-SIIb)', or $—(X^3—L^3)—$ represents a direct bond.

Specifically, the same as described in the above formulae (BPF-SIIb) and (BPF-SIIb)' are exemplified.

Component (H):

Block copolymer (BP) in the invention contains a polymer component (H) having at least one reactive group capable of being involved in crosslinking reaction in at least either block of block [A] or block [B]. Polymer component (H) contains a reactive group capable of being involved in crosslinking reaction in a substituent, and is a repeating unit corresponding to a monofunctional monomer copolymerizable with polymer block [A] or block [B]. The structure represented by the following formula (HI) is exemplified as the specific example of polymer component (H).

In formula (HI), $a^{11}$, $a^{12}$, $a^{13}$, $X^1$ and $L^1$ represent the same contents as in formula (I). In formula (HI), the preferred mode of the structure represented by the following formula (HI) is also the same as in formula (I).

In formula (HI), Y represents a reactive group capable of being involved in crosslinking reaction.

As the reactive group capable of being involved in crosslinking reaction, e.g., a group having an active hydrogen atom (e.g., a hydroxyl group, a carboxyl group, an amino group, a carbamoyl group, a mercapto group, a β-keto ester group, a hydrosilyl group, a silanol group), a cation polymerizable group (e.g., an epoxy group, an oxetanyl group, an oxazolyl group, a vinyloxy group), an acid anhydride, a group having a radical polymerizable unsaturated double bond (e.g., an acryloyl group, a methacryloyl group), a hydrolyzable silyl group (e.g., an alkoxysilyl group, an acyloxysilyl group), a group capable of being substituted with a nucleophilic agent (e.g., an active halogen atom, sulfonic ester), and an isocyanate group (e.g., a blocked isocyanate group capable of generating an isocyanate group by heating may be used) are exemplified.

These reactive groups may be introduced from the stage of monomers or may be introduced by a polymer reaction. As the polymer reaction, the methods described, e.g., in Yoshio Iwakura and Megumi Kurita, *Hannosei Kobunshi (Reactive Polymers)*, published by Kodansha Co. (1977) are exemplified.

Of these crosslinking reactive groups, a hydroxyl group, an epoxy group, a vinyloxy group, a (meth)acryloyl group and a hydrolyzable silyl group are preferred.

The content of the repeating units having crosslinking reactive groups is preferably from 1 to 30 mass % in all the polymer components, more preferably from 5 to 25 mass %, and particularly preferably from 5 to 20 mass %. Sufficient film strength can be obtained in this range of the content, and a high anti-pollution property of the film can be obtained.

The specific examples of the polymer units capable of being involved in crosslinking reaction are shown below, but the present invention is not limited to these compounds.

(h-1)

$m1$: an integer of from 2 to 12
$Y^1$: —OH, —NH$_2$, —COOH, —CH(O)CH$_2$,
—O(CH$_2$)$_3$Si(OR')$_3$,
—O(CH$_2$)$_3$Si(R")(OR')$_2$ [R', R": —CH$_3$, —C$_2$H$_5$]

(h-2)

$m2$: an integer of from 1 to 8

(h-3)

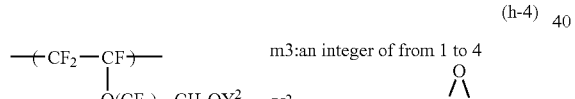

(h-4)

$m3$: an integer of from 1 to 4
$Y^2$: —H, —CH$_2$CH(O)CH$_2$

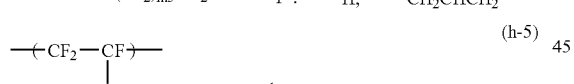

(h-5)

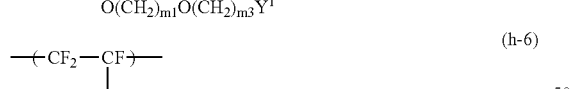

(h-6)

(h-7)

(h-8)

$m4$: an integer of 2 or 3

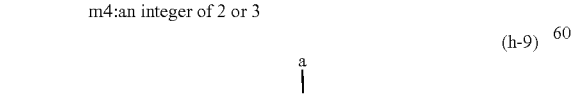

(h-9)

$a$ = H, —CH$_3$

-continued

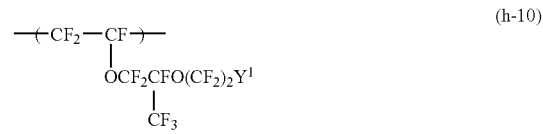

(h-10)

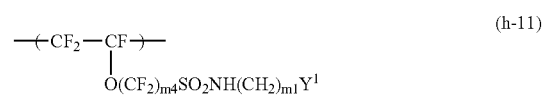

(h-11)

(h-12)

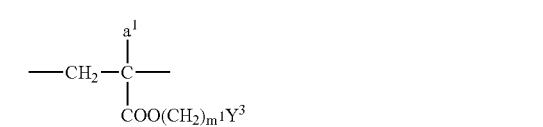

(h-13)

$m^1$: an integer of from 2 to 8
$a^1$: H, CH$_3$, F
$Y^3$: —OH, —NH$_2$, —COOH, —NCO, —CHCH$_2$(O),
—Si(OR')$_3$, —Si(R")(OR')$_2$ [R', R": —CH$_3$, —C$_2$H$_5$]

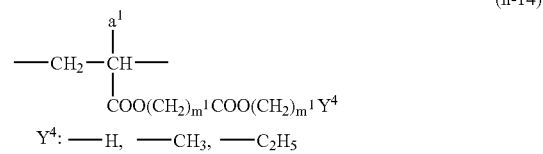

(h-14)

$Y^4$: —H, —CH$_3$, —C$_2$H$_5$

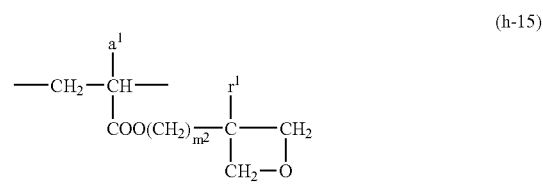

(h-15)

$m^2$: an integer of from 1 to 4
$r^1$: —H, —CH$_3$, —C$_2$H$_5$

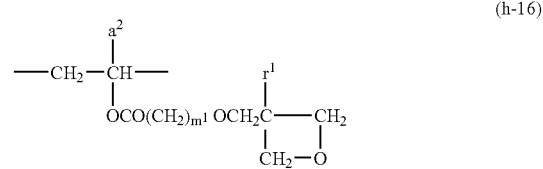

(h-16)

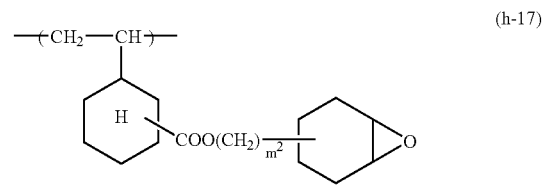

(h-17)

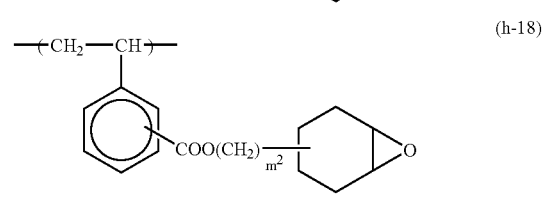

(h-18)

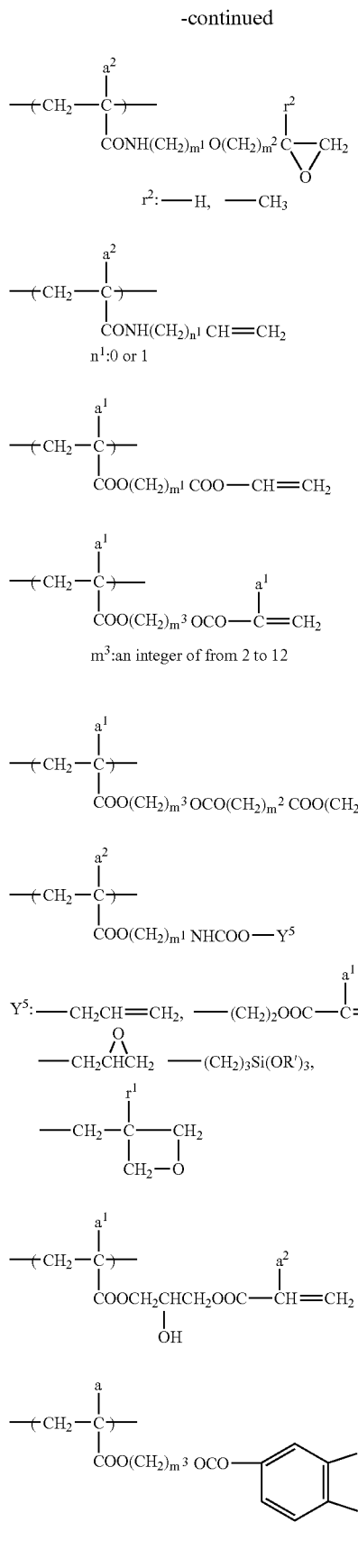

Other Copolymer Components:

Block copolymer (BP) may further contain, in addition to the copolymer components (including component (H)) contained in block [A] and block [B], other copolymer components corresponding to monomers copolymerizable with the above copolymer components in each block.

As other copolymer components, e.g., fluoroolefins (e.g., perfluoroethylene, hexafluoroethylene), alkyl vinyl ethers (as the alkyl group, e.g., methyl, ethyl, propyl, butyl), cyclohexyl vinyl ethers, fluorine-containing alkyl vinyl ethers having from 1 to 30 carbon atoms {e.g., they may be $-CF_2CF_3$, $-CH_2(CF_2)_4H$, or $-CH_2(CF_2)_8CF_3$, $-CH_2CH_2(CF_2)_4H$, they may have a branched structure [e.g., $CH(CF_3)_2$, $CH_2CF(CF_3)_2$, $CH(CH_3)CF_2CF_3$, $CH(CH_3)(CF_2)5CF_2H$], or they may have an alicyclic structure (preferably a 5- or 6-membered, e.g., a perfluorocyclohexyl group, a perfluorocyclopentyl group, or alkyl groups substituted by these groups), or they may have an ether bond (e.g., $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$)}, and vinyl esters or allyl esters of aliphatic carboxylic acids (as the aliphatic carboxylic acids, e.g., acetic acid, propionic acid, butyric acid, cyclohexane-carboxylic acid) are exemplified.

The introduced amount of these copolymer components to block copolymer (BPF) is preferably 35 mass % or less in all the polymer components, more preferably 20 mass % or less, and particularly preferably from 5 to 10 mass %.

Block copolymer (BPS) may contain the above copolymer components as the copolymer components constituting the graft moiety. Fluorine-containing monomers are particularly preferred.

The introduced amount of these copolymer components to block copolymer (BPS) is preferably 35 mass % or less in all the polymer components constituting the graft moiety, more preferably 20 mass % or less.

These copolymer components can be arbitrarily selected from various viewpoints of hardness, adhesion to substrates, solubility in solvents, and transparency.

Synthesis of Block Copolymer (BPF):

Block copolymer (BPF) in the invention can be easily synthesized by well-known methods.

When c is 0 in formula (FI), a copolymer mainly comprising perfluorocycloalkane structure can be obtained by a radical polymerization reaction of a corresponding perfluorocycloalkene compound and other copolymerizable monomer.

Specifically, polymerization conditions disclosed in JP-A-2001-272504 can be used.

On the other hand, when c is 1 in formula (FI), a copolymer mainly comprising fluorine-containing alicyclic structure represented by formula (FII) can be obtained by a radical cyclization polymerization reaction of a non-conjugated perfluorodiene compound corresponding to the polymer component.

At this time, the copolymer can be obtained by the polymerization reaction by introducing a copolymerizable monomer by radical polymerization reaction.

Specifically, the methods as described in Zhen-Uy Yaug et al., *J. Am. Chem. Soc.*, 116 (No. 9), 4135-4136 (1994), JP-A-1-131215, JP-A-2001-206864 and JP-A-2001-302725 can be referred to.

As the method of introducing siloxane component constituting the graft moiety to block copolymer (BPF), the following two methods are exemplified.

(1) A method of manufacture by polymer reaction of perfluorocycloolefin copolymer (FP), which is obtained at least by radical copolymerization reaction of a polymerizable perfluoro compound and a monomer containing a reactive group (e.g., a carboxyl group, a cyclic acid anhydride group, a hydroxyl group, a mercapto group, an amino group, an isocyanate group, an epoxy group, a formyl group, a halogen atom (chlorine, bromine, iodine)), with monofunctional siloxane-containing oligomer (SO) having an opposite reactive group chemically bonding to the above reactive group bonded to one terminal of the main chain of the oligomer having a siloxane structure is exemplified (hereinafter this method is abbreviated to "a polymer reaction method").

The above method is explained taking as an example the case where polymer reaction is performed with 100 mass parts of a perfluorocycloolefin copolymer (FP) and x mass parts of monofunctional siloxane-containing oligomer (SO).

As copolymer (FP) used at this time, the moiety that constitutes block [A] of block copolymer (BPF) is taken as a' mass %, and component (H) as h' mass %.

A in block copolymer (BPF):

$$a(\text{mass \%}) = [a'/(100+x)] \times 100$$

B in block copolymer (BPF):

$$b(\text{mass \%}) = [x/(100+x)] \times 100$$

H in block copolymer (BPF):

$$h(\text{mass \%}) = 100 - \{a+b+[h'/(100+x)] \times 100\}$$

As described above, block copolymer (BPF) of the invention is manufactured by arbitrary combinations of chemical bonding of the reactive group of monofunctional siloxane-containing oligomer (SO) and a reactive group in perfluorocycloolefin copolymer (FP) For instance, a combination of a reactive group having an active hydrogen atom (a hydroxyl group, an amino group, a mercapto group or a carboxyl group) with an isocyanate group, an epoxy group or a cyclic acid anhydride group, a combination of a 3-membered group (e.g., the following group) such as an epoxy group with the above reactive group having an active hydrogen atom or acyclic acid anhydride group, and a combination of a carboxyl group with a 3-membered group (e.g., a hydroxyl group, an amino group or an epoxy group), an isocyanate group are exemplified. Addition reaction of a combination of a reactive group having an active hydrogen atom with an isocyanate group, an epoxy group or a cyclic acid anhydride group is preferred.

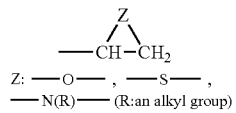

Z: —O—, —S—, —N(R)— (R: an alkyl group)

It is preferred to use a catalyst in combination for accelerating the reaction. Catalysts are properly selected according to the manner of the polymer reaction based on conventionally well-known chemical reactions.

The obtained polymer may be used as it is as the film-forming composition of the invention, but it is preferred for the polymer to be reprecipitated in a bad solvent of the polymer.

The solvent for reprecipitation is not particularly restricted but methanol, ethanol, isopropanol, acetonitrile, hexane, petroleum ether and ligroin are exemplified for easiness of drying and removing of solvent.

(2) As another method, a method of manufacture by using at least a polymerizable perfluoro compound, a monofunctional macro monomer containing a siloxane structure having a polymerizable double bond group polymerizable with the perfluoro compound on one terminal of the main chain of the polymer, and a monomer containing a crosslinkable reactive group (corresponding to component (H)), by polymerization with a radical polymerization initiator (e.g., peroxides and azobis compounds) is exemplified.

The amount of the polymerization initiator used here is from 0.5 to 15 mass parts per 100 mass parts in total of all the monomers and the macro monomers, preferably from 1 to 10 mass parts.

The monofunctional macro monomer containing a siloxane structure can be manufactured by conventional well-known synthesizing methods of macro monomers.

As such methods, e.g., the following methods are exemplified.

(i) An ionic polymerization method of reacting various reagents with the terminal of a living polymer obtained by anionic polymerization to thereby make a macro monomer, (ii) A radical polymerization method of reacting various reagents with an oligomer having a reactive group on the terminal obtained by using a polymerization initiator and/or a chain transfer agent containing a reactive group, e.g., a carboxyl group, a hydroxyl group, or an amino group in the molecule, to thereby make a macro monomer.

Specifically, monofunctional macro monomers containing a siloxane structure can be synthesized according to the general remarks and methods described in the literatures and patents cited, e.g., in P. Dreyfuss & R. P. Quirk, *Encycl. Polym. Sci. Eng.*, 7, 551 (1987), P. F. Rempp & F. Franta, *Adv. Polym. Sci.*, 58, 1 (1984), V. Percec, *Appl. Polym. Sci.*, 285, 95 (1984), R. Asami & M. Takari, *Makromol. Chem. Suppln.* 12, 163 (1985), P. Rempp et al., *Makromol. Chem. Suppln.* 8, 3 (1984), Yuya Yamashita, *Macro-monomer no Kagaku to Kogyo (Science and Industry of Macro-Monomer)*, I.B.C. (1989).

The formula and the specific examples of polymerizable groups linking to the main chains of monofunctional macro monomers containing a siloxane structure are shown below, however, the present invention is not limited thereto.

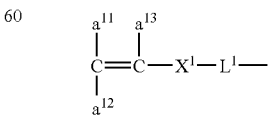

Formula of polymerizable group

In the above "formula of polymerizable group", $a^{11}$, $a^{12}$, $a^{13}$, $X^1$ and $L^1$ have the same meaning as in formula (I).

(1)
m1: an integer of from 1 to 12
b = —H, —CH$_3$
α: 0 or 1

(2)
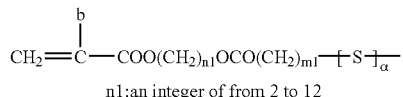
n1: an integer of from 2 to 12

(3)
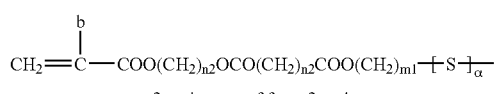
n2: an integer of from 2 to 4

(4)
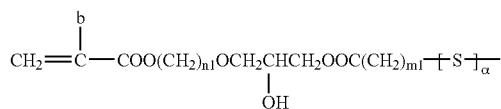

(5)
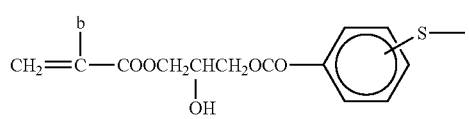

(6)
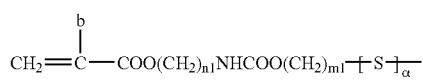

(7)
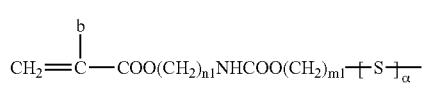

(8)
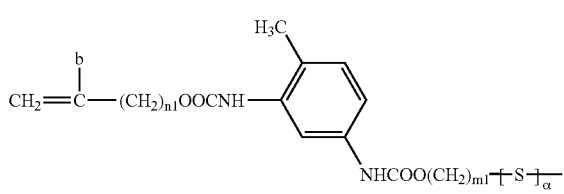

(9)
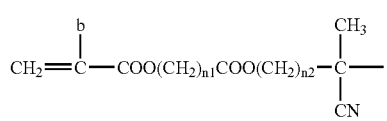

(10)
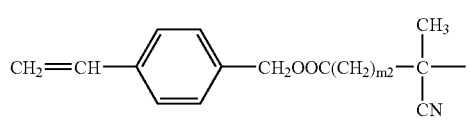
m2: an integer of 2 or 3

(11)
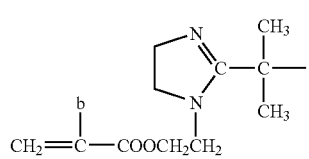

(12)
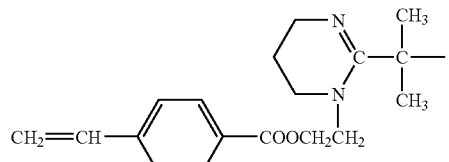

(13)
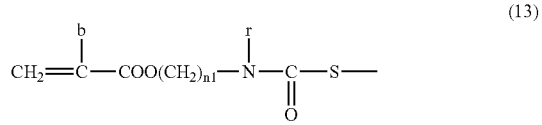
r: —H, —C$_n$H$_{2n+1}$ (n: an integer of from 1 to 6),
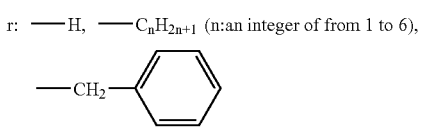

(14)
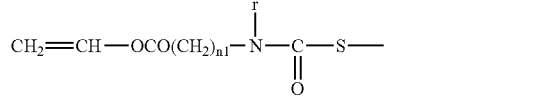

(15)
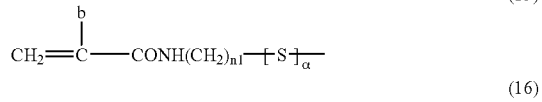

(16)
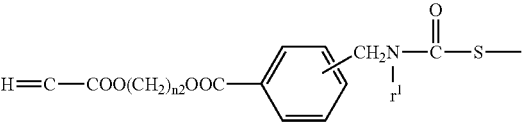
r$^1$: —H, —C$_n$H$_{2n+1}$

(17)
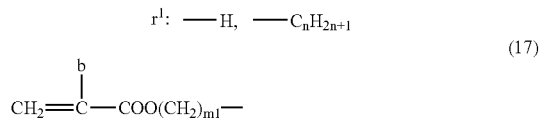

The polymer chain of the graft moiety (block [B]) of block copolymer (BPF) in the invention has a mass average molecular weight of preferably from $1 \times 10^3$ to $2 \times 10^4$, more preferably from $3 \times 10^3$ to $1.5 \times 10^4$. When the mass average molecular weight is in this range, the peculiar characteristics of the invention can be exhibited and the polymer reaction of the oligomer (SO) or the copolymerization reaction of macro monomer sufficiently progress.

As preferred block copolymer (BPF) in the invention, a copolymer comprising component (H) bonded to the terminal of the main chain and/or the side chain of the copolymer is exemplified.

As the method of introducing component (H) to block copolymer (BPF) of the invention, specifically, (i) a method of polymerizing a mixture of a chain transfer agent containing a specific polar group (e.g., a hydroxyl group, a carboxyl group, an amino group, a halogen atom, an epoxy group, an acid halide group) with a polymerization initiator (e.g., an azobis compound, peroxide), (ii) a method of using the polar groups in both a chain transfer agent and a polymerization initiator, and (iii) a method of, after performing polymerization reaction with a chain transfer agent or a polymerization initiator in the former two methods, introducing a crosslinking reactive group by further reacting with these functional groups by a polymer reaction are exemplified. It is particularly preferred to introduce component (H) to block copolymer (BPF) by these methods in the case where the crosslinking reactive group is a radical polymerizable double bond group. Specifically, the general remarks and the methods described in the literatures cited in P. Dreyfuss & R. P. Quirk, *Encycl. Polym. Sci. Eng.*, 7, 551 (1987), Yoshiki Chujo and Yuya Yamashita, *Senryo to Yakuhin (Dyes and Chemicals)*, 30, 232 (1985), and Akira Ueda and Susumu Nagai, *Kagaku to Kogyo (Science and Industry)*, 60, 57 (1986) can be referred to.

Synthesis of Block Copolymer (BPS):

Copolymer components of graft moiety represented by (BPS-FI) and (BPS-FII) can be introduced into block copolymer (BPS) by the same polymer reaction method, macro monomer copolymerization reaction as described in "Synthesis of block copolymer (BPF)".

The introduction of a reactive group or a radical polymerizable double bond group to one terminal of the main chain of a polymer containing a fluorine-containing alicyclic structure can be performed by the same method as the method of introducing component (H) to block copolymer (BPF).

The composition ratio by mass of block [A] and block [B] is preferably from 3/97 to 95/5, more preferably from 5/95 to 80/20, and most preferably from 10/90 to 50/50.

The amount introduced of component (H) and other copolymer components is the same as in the case of block copolymer (BPF).

Block copolymer (BP) accounts for from 5 to 99.5 mass % of the total solid contents of the film-forming composition, more preferably from 20 to 99 mass %, and still more preferably from 30 to 95 mass %.

Curing Agent and Curing Accelerator:

At least a curing agent or a curing accelerator is used in a film-forming composition of the invention. These are arbitrarily selected from well-known compounds according to the curing reaction of the crosslinking reactive moiety in block copolymer (BP).

For example, the compounds described in Shinzo Yamashita and Tosuke Kaneko compiled, *Kakyozai Handbook (Handbook of Crosslinking Agent)*, Taiseisha Co. (1981), and Kobunshi Gaggai compiled, *Kobunshi Data Handbook, Kisohen (Polymer Data Handbook, Elementary Course)*, Baifukan Co. (1986) can be used.

In addition, organic silane compounds, polyisocyanate compounds, polyol compounds, polyamine compounds, acid anhydride compounds, polyepoxy group-containing compounds, epoxy resins (e.g., the compounds described in Hiroshi Horiuchi compiled, *Shin Epoxy Jushi (New Epoxy Resins)*, Shokodo Co. (1985), Kuniyuki Hashimoto compiled, *Epoxy Jushi (Epoxy Resins)*, Nikkan Kogyo Shinbunsha (1969)), melamine resins (e.g., the compounds described in Ichiro Miwa and Hideo Matsunaga compiled, *Urea•Melamine Jushi (Urea•Melamine Resins)*, Nikkan Kogyo Shinbunsha (1969)), poly(meth)acrylate compounds (e.g., the compounds described in Shin Okawara, Takeo Saegusa and Toshinobu Higashimura compiled, *Oligomers*, Kodansha Co. (1976), Eizo Omori, *Kinosei Acryl Jushi (Functional Acrylate Resins)*, Techno-System Co. (1985)) are exemplified.

For instance, when component (H) contains a hydrolyzable silyl group as curing reactive moiety, well-known acids, basic catalysts and metal chelate compounds can be used as curing accelerators.

As the acids, inorganic acids, e.g., hydrochloric acid, sulfuric acid, nitric acid and phosphoric acids, organic acids, e.g., acetic acid, formic acid, methanesulfonic acid, trifluoromethylsulfonic acid and paratoluenesulfonic acid, and Lewis acids, e.g., Brønsted acid, dibutyltin dilaurate, dibutyltin diacetate, dibutyltin dioctate, triisopropoxy-aluminum, tetrabutoxyzirconium and tetrabutoxytitanate are exemplified.

As the bases, inorganic and organic compounds, e.g., ammonia, triethylamine, pyridine, tetramethylethyelene-diamine are exemplified.

As the metal chelate compounds, chelates compounds of active methylene compounds (e.g., diketones, β-keto esters) and metal atoms, e.g., Al, Ti and Zr are exemplified. These compounds are disclosed, e.g., in JP-A-11-106704, paragraphs [0044] to [0046].

As preferred compounds, tri-n-butoxyethylacetoacetate zirconium, diisopropoxybis(acetylacetonate) titanium, diisopropoxyethylacetoacetate aluminum and tris(ethyl-acetoacetate) aluminum are exemplified.

The use amount of these curing accelerators varies according to the kinds of compounds, and the moieties of curing reaction, but the amount is generally from 0.1 to 15 mass % of the total solid contents of the film-forming composition, more preferably from 0.5 to 5 mass %.

From the viewpoint of the preservation stability of a film-forming composition, compounds capable of generating curing accelerators such as acids or bases by the action of light may be used. When such compounds are used, curing of films becomes possible by irradiation with actinic energy rays.

As compounds capable of generating acids by the action of light, various examples are described, e.g., in Organic Electronics Zairyo Kenkyukai compiled, *Imaging yo Yuki Zairyo (Organic Materials for Imaging)*, pp. 187 to 198, Bunshin Publishing Co., and JP-A-10-282644, and these well-known compounds can be used. Specifically, various onium salts, e.g., diazonium salts, ammonium salts, phosphonium salts, iodonium salts, sulfonium salts, selenonium salts, and arsonium salts having $RSO_3^-$ (R represents an alkyl group or an aryl group), $AsFe^-$, $SbF_6^-$, $PF_6^-$ or $BF_4^-$ as counter ions, organic halides, e.g., oxadiazole derivatives and S-triazine derivatives substituted with a trihalomethyl group, and o-nitrobenzyl ester, benzoyl ester, imino ester and disulfone compounds of organic acid are exemplified. Preferably onium salts, and particularly preferably sulfonium salts and iodonium salts are exemplified.

As compounds capable of generating bases by the action of light, well-known compounds can be used. Specifically, nitrobenzyl carbamates and dinitrobenzyl carbamates are exemplified.

It is particularly preferred in the invention to use compounds capable of generating the above-described acids by the action of light.

It is also preferred to use sensitizing dyes in combination with these compounds capable of generating acids or bases by the action of light.

The addition amount of the compounds for accelerating curing by the action of light is preferably from 0.1 to 15 mass % of the total solid contents in the film-forming composition, more preferably from 0.5 to 5 mass %.

As other curing accelerator, dehydrating agents may be used.

As dehydrating agents, e.g., orthocarboxylic esters (methyl orthoformate, ethyl orthoformate, methyl ortho-acetate) and acid anhydride (acetic anhydride) are exemplified.

It is preferred for use organosilane compounds as the curing agent.

For instance, alkoxysilane compounds and acyloxysilane compounds are used, and alkoxysilane compounds are preferred for the stability of compounds as materials.

Specifically, tetramethoxysilane, tetraethoxysilane, tetraisopropoxysilane, tetra-n-butoxysilane, methyltrimethoxysilane, methyltriethoxysilane, ethyltrimethoxy-silane, vinyltrimethoxysilane, vinyltriethoxysilane, phenyltrimethoxysilane, phenyltriethoxysilane, $CF_3CH_2CH_2Si(OCH_3)_3$, $CF_3(CF_2)_5CH_2CH_2Si\ (OCH_3)_3$, γ-glycidoxypropyltrimethoxysilane, γ-glycidoxypropyltriethoxysilane, γ-aminopropyltrimethoxy-silane, γ-trimethoxysilylpropyl isocyanate, γ-mercapto-propyltrimethoxysilane, γ-methacryloxypropyltrimethoxysilane, γ-acryloxypropyltrimethoxysilane, dimethyldimethoxysilane, dimethyldiethoxysilane, γ-glycidoxypropylmethyldimethoxysilane, γ-aminopropylmethyltriethoxysilane, γ-mercaptopropylmethyldimethoxysilane, and γ-methacryloxy-propylmethyldimethoxysilane are exemplified, however, the present invention is not limited to these compounds.

More preferably, organosilane compounds represented by formula $(R^{31})Si(OR^{32})_3$ or $(R^{31})(R^{33})Si(OR^{32})_2$, wherein at least one of $R^{31}$ and $R^{33}$ contains a fluorine atom are exemplified.

Here, $R^{31}$ represents an organic group having from 1 to 10 carbon atoms, e.g., $CF_3CH_2$—, $(CF)_2CH$—, $CF_2=CF$—, $CF_3CH_2CH_2CH_2$—, $C_2F_5CH_2CH_2CH_2$—, $C_3F_7CH_2CH_2CH_2$—, $C_2F_5CH_2CH_2$—, $CF_3OCH_2CH_2CH_2$—, $C_2F_5OCH_2CH_2CH_2$—, $C_3F_7OCH_2CH_2CH_2$—, $(C\ F_3)_2CHOCH_2CH_2CH_2$—, $C_4F_9CH_2OCH_2CH_2CH_2$—, 3-(perfluorocyclohexyloxy)propyl, $H(CF_2)_4CH_2OCH_2CH_2CH_2$—, and $H(CF_2)_4CH_2CH_2CH_2$— are exemplified.

In the organosilanes, $R^{32}$ represents an alkyl group having from 1 to 5 carbon atoms or an acyl group having from 1 to 4 carbon atoms, e.g., methyl, ethyl, n-propyl, i-propyl, n-butyl, sec-butyl, tert-butyl, and acetyl. $R^{33}$ represents an organic group having from 1 to 10 carbon atoms, e.g., an alkyl group, e.g., methyl, ethyl, propyl, butyl, cyclohexyl, and cyclohexylmethyl, and as other organic groups, a γ-chloro-propyl group, a vinyl group, a γ-glycidoxypropyl group, a γ-methacryloxypropyl group, a γ-mercaptopropyl group, a phenyl group, and a 3,4-epoxycyclohexylethyl group, and the same fluorine-containing organic groups as in $R^{31}$ are exemplified.

The addition amount of these silane compounds as the curing agents is preferably from 0.5 to 300 mass parts per 100 mass parts of the block copolymer (BP), and particularly preferably from 5.0 to 100 mass parts or so.

On the other hand, when the curing reactive moiety of polymer component (H) is a group having active hydrogen, e.g., a hydroxyl group, an amino group or a mercapto group, polyisocyanate, aminoplast, polybasic acid or anhydride of the polybasic acid can be exemplified as the curing agents.

As polyisocyanates, polyisocyanate compounds, e.g., m-xylylene diisocyanate, toluene-2,4-diisocyanate, hexamethylene diisocyanate, and isophorone diisocyanate, silyl isocyanate compounds, e.g., methylsilyl triisocyanate, and partial condensation products of these isocyanate compounds, addition products with polymers, polyhydric alcohols, low molecular weight polyester films, and blocked polyisocyanate compounds obtained by blocking an isocyanate group with a blocking agent such as phenol are exemplified.

As aminoplasts, melamine films, guanamine films and urea films are adopted. Specifically, methylolmelamine at least partially etherified with one or two or more lower alcohols such as methanol, ethanol, propanol or butanol (e.g., hexa-methyl etherified methylolmelamine, hexabutyl etherified methylolmelamine, methyl-butyl mixture etherified methylol-melamine, methyl etherified methylolmelamine, and butyl etherified methylolmelamine) or condensed products of these compounds are exemplified.

As polybasic acids or anhydrides thereof, aromatic polyvalent carboxylic acids and anhydrides thereof, e.g., pyromellitic acid, pyromellitic anhydride, trimellitic acid, trimellitic anhydride, phthalic acid, and phthalic anhydride, aliphatic polyvalent carboxylic acids and anhydrides thereof, e.g., maleic acid, maleic anhydride, succinic acid, and succinic anhydride are exemplified.

On the other hand, when the curing reactive group of polymer component (H) is an epoxy group or an oxetanyl group, the polymer can be cured by a chemical reaction with a reactive group having active hydrogen (e.g., a hydroxyl group, an amino group or a mercapto group), or a group containing a cyclic acid anhydride.

At this time, the above reactive groups may be contained as the copolymer components in block copolymer (BP), or block copolymers (BP) respectively containing at least one of these reactive groups may be used in combination.

In this case, the same acids or bases as above, the same compounds as above capable of generating acids or bases by light and/or heat are used as curing accelerators. As other preferred embodiments, curing agents comprising a polyfunctional compound containing, two or more in the molecule, the above reactive groups capable of reaction with an epoxy group or an oxetanyl group, or groups containing cyclic acid anhydrides are exemplified.

In the case of cationic polymerizable groups (a cationic polymerizable group: a reactive group capable of causing a polymerization reaction and/or a crosslinking reaction when irradiated with actinic energy rays in the presence of an actinic energy ray-sensitive cationic polymerization initiator), as the representatives of the cationic polymerizable groups, an epoxy group, an oxetane group, a cyclic acetal group, a cyclic lactone group, a cyclic thioether group, a spiro-ortho ester group, and a vinyl ether group are exemplified. In the invention, one of these groups may be used or two or more groups may be used.

As the specific examples of cationic polymerizable compounds, (1) epoxy group-containing compounds, e.g., alicyclic epoxy resins, aliphatic epoxy resins, and aromatic epoxy resins, (2) Oxetane compounds, e.g., trimethylene oxide, 3,3-dimethyloxetane, 3,3-dichloromethyloxetane, 3-methyl, 3-phenoxymethyloxetane, and 1,4-bis[(3-ethyl-3-oxetanyl-methoxy)methyl]benzene, oxoran compounds, e.g., tetrahydrofuran, and 2,3-dimethyltetrahydrofuran, cyclic ether or cyclic acetal compounds, e.g., trioxane, 1,3-dioxoran, and 1,3,6-trioxanecyclooctane, (3) cyclic lactone compounds, e.g., β-propiolactone and ε-caprolactone, (4) Thiirane compounds, e.g., ethylene sulfide and thio-epichlorohydrin, (5) Thyethane compounds, e.g., 1,3-propyne sulfide and 3,3-dimethylthyethane, (6) vinyloxy group-containing vinyl ether compounds, (7) Spiro-ortho ester compounds obtained by the reaction of an epoxy compound and lactone.

Of the above compounds, compounds containing an epoxy group or a vinyloxy group are preferably used in the invention as the cationic polymerizable organic compounds, and polyepoxy compounds having two or more epoxy groups in the molecule, polyvinyloxy compounds having two or more vinyloxy groups in the molecule, and compounds having at least one epoxy group and at least one vinyloxy group are more preferably used. In particular, when an epoxy compound containing an alicyclic polyepoxy compound having two or more epoxy groups in one molecule and the content of the alicyclic polyepoxy compound is 30 mass % or more based on the total mass of the epoxy compound (mixture of epoxy compounds), more preferably 50 mass % or more, is used as the cationic polymerizable compounds, cationic polymerization velocity, film curing property, resolution and ultraviolet ray transmittance are more improved, the viscosity of resin compositions lower and film formation progress smoothly.

As the above alicyclic epoxy resins, polyglycidyl ether of polyhydric alcohol having at least one alicyclic ring, or compounds containing cyclohexene oxide or cyclopentene oxide obtained by epoxidizing compounds containing an unsaturated alicyclic ring (e.g., cyclohexene, cyclopentene, dicyclo-octene, tricyclodecene) with a proper oxidant, e.g., hydrogen peroxide or peracid are exemplified.

As the above aliphatic epoxy resins, polyglycidyl ether of aliphatic polyhydric alcohol or alkylene oxide adducts of aliphatic polyhydric alcohol, polyglycidyl ester of aliphatic long chain polybasic acid, homopolymers and copolymers of glycidyl acrylate and glycidyl methacrylate are exemplified. Further, besides the above epoxy compounds, e.g., monoglycidyl ethers of aliphatic higher alcohols, glycidyl esters of higher fatty acids, epoxidized soybean oil, butyl epoxystearate, octyl epoxystearate, epoxidized linseed oil, and epoxidized polybutadiene are exemplified. In addition to the above compounds, epoxy silicones, e.g., K-62-722 (manufactured by Shin Etsu Chemical Co., Ltd., Silicone Division), UV9300 (manufactured by GE Toshiba Silicones), and the polyfunctional epoxy compounds such as silicone-containing epoxy compounds described in *Journal of Polymer Science: Part A: Polymer Chemistry*, Vol. 28, 497 (1990) are exemplified.

As the above-described aromatic epoxy resins, e.g., monohydric or polyhydric phenols having at least one aromatic nucleus, and mono- and polyglycidyl ethers of alkylene oxide adducts of them can be exemplified.

As the specific examples of these aromatic epoxy resins, the compounds disclosed in JP-A-11-242101, paragraphs from [0084] to [0086] are exemplified.

Of these epoxides, aromatic epoxides and alicyclic epoxides are preferred taking their rapid curing velocity into consideration, in particular alicyclic epoxides are preferred. In the present invention, these epoxides may be used alone, or two or more of them may be used in combination arbitrarily.

As the compounds having an oxetanyl group, the number of oxetanyl groups contained in the molecule is from 1 to 10, preferably from 1 to 4. It is preferred to use these compounds in combination with epoxy group-containing compounds. Specifically, the compounds disclosed in JP-A-2000-239309, paragraphs from [0024] to [0025] and the silicon-containing oxetacene compounds described in J. V. Crivello et al., *J.M.S. -Pureappl. Chem.*, A30, pp. 173 to 187 (1993) are exemplified.

As bicyclo-ortho ester compounds, e.g., the compounds disclosed in JP-T-2000-506908 (the term "JP-T" as used herein means a "published Japanese translation of a PCT application"), 1-phenyl-4-ethyl-2,6,7-trioxabicyclo[2,2,2]octane and 1-ethyl-4-hydroxymethyl-2,6,7-trioxabicyclo[2,2,2]octane can be exemplified.

As spiro-ortho carbonate compounds, 1,5,7,11-tetraoxaspiro[5,5]undecane, 3,9-dibenzyl-1,5,7-11-spiro[5,5]-undecane, 1,4,6-trioxaspiro[4,4]nonane, 2-methyl-1,4,6-trioxaspiro[4,4]nonane, and 1,4,6-trioxaspiro[4,5]decane can be exemplified.

As vinyloxy compounds, alkenyl vinyl ether compounds, e.g., 2-methacryloyloxy ethyl vinyl ether and 2-acryloyloxy ethyl vinyl ether, cationic polymerizable nitrogen-containing compounds, e.g., N-vinylcarbazole and N-vinylpyrrolidone, polyfunctional vinyl compounds, e.g., butanediol divinyl ether, triethylene glycol divinyl ether, cyclohexanediol divinyl ether, 1,4-benzenedimethanol divinyl ether, hydroquinone divinyl ether, and sazorcinol divinyl ether, the propenyl compounds described in *Journal of Polymer Science: Part A: Polymer Chemistry*, Vol. 32, 2985 (1994), the alkoxyallene compounds described in *Journal of Polymer Science: Part A: Polymer Chemistry*, Vol. 33, 2493 (1995), the vinyl compounds described in *Journal of Polymer Science: Part A: Polymer Chemistry*, Vol. 34, 1015 (1996), and the isopropenyl compounds described in *Journal of Polymer Science: Part A: Polymer Chemistry*, Vol. 34, 2051 (1996). The specific examples are disclosed in JP-A-2002-29162, paragraphs from [0022] to [0029].

Of these vinyl ether compounds, di- and trivinyl ether compounds are preferred considering their curing property, adhesion and surface hardness. In the present invention, vinyl ether compounds may be used alone or in combination of two or more compounds properly.

When these curing agents are added, the addition amount is preferably from 0.5 to 300 mass parts per 100 mass parts of block copolymer (BP), and particularly preferably from 5.0 to 100 mass parts. These curing agents comprising a cationic polymerizable reactive group use an acid or a photo-acid generating compound as a curing accelerator. Specifically, the same compounds as described in silyl reactive groups are used.

On the other hand, in the case where the crosslinking reactive moiety of a polymer has a radical polymerizable unsaturated double bond (an acryloyl group, a methacryloyl group), it is preferred to use a radical polymerizable compound as a curing agent and a compound capable of generating a radical by light and/or heat as a curing accelerator. The radical polymerizable compound is preferably a polyfunctional compound having from 2 to 10 polymerizable groups, more preferably from 2 to 6 polymerizable groups.

It is preferred that polymerizable compounds having well copolymerizable groups with the radical polymerizable groups contained in block copolymer (BP) be arbitrarily selected and combined as the curing agent.

As the examples of such polymerizable compounds, unsaturated carboxylic acids (e.g., acrylic acid, methacrylic acid, itaconic acid, crotonic acid, isocrotonic acid and maleic acid), and esters and amides of these unsaturated carboxylic acids are exemplified, preferably esters of unsaturated carboxylic acids with aliphatic polyhydric alcohol compounds and amides of unsaturated carboxylic acids with aliphatic polyvalent amine compounds are exemplified. Further, addition reactants of esters and amides of unsaturated carboxylic acids having a nucleophilic substituent such as a hydroxyl group, an amino group or a mercapto group and monofunctional or polyfunctional isocyanates or epoxies, and dehydration condensation reactants with polyfunctional carboxylic acids are also preferably used. Further, addition reactants of esters or amides of unsaturated carboxylic acids having an electrophilic substituent such as an isocyanate group or an epoxy group and monofunctional or polyfunctional alcohols, amines and thiols, and substitution reactants of esters and amides of unsaturated carboxylic acids having a separable substituent such as a halide group or a tosyloxy group and monofunctional or polyfunctional alcohols, amines and thiols are also preferably used. As another example, it is also possible to use compounds substituting these unsaturated carboxylic acids with unsaturated phosphonic acids or styrene.

As aliphatic polyhydric alcohol compounds, mono-substituted or poly-substituted polymerizable compounds of ethylene glycol, propylene glycol, 1,4-butanediol, neopentyl glycol, trimethylolpropane, hexanediol, cyclohexyldiol, cyclohexanedimethanol, pentaerythritol, or sorbitol with unsaturated carboxylic acids (e.g., crotonic acid, acrylic acid, methacrylic acid, itaconic acid, or maleic acid) are exemplified.

As the other examples of esters, e.g., vinyl methacrylate, allyl methacrylate, allyl acrylate, aliphatic alcohol esters disclosed in JP-B-46-27926 (the term "JP-B" as used herein means an "examined Japanese patent publication"), JP-B-51-47334 and JP-A-57-196231, esters having an aromatic skeleton disclosed in JP-A-59-5240, JP-A-59-5241 and JP-A-2-226149, and esters having an amino group disclosed in JP-A-1-165613 are also preferably used.

The specific examples of amide monomers of aliphatic polyvalent amine compounds and unsaturated carboxylic acids include methylenebisacrylamide, methylenebismethacrylamide, 1,6-hexamethylenebisacrylamide, 1,6-hexamethylenebis-methacrylamide, diethylenetriaminetrisacrylamide, xylylenebisacrylamide, and xylylenebismethacrylamide.

As the examples of other preferred amide monomers, the compounds having a cyclohexylene structure disclosed in JP-B-54-21726 are exemplified.

Addition polymerizable compounds of urethane manufactured by the addition reaction of isocyanate and a hydroxyl group is also preferred, and as the specific example, e.g., a vinyl urethane compound containing two or more polymerizable vinyl groups in one molecule obtained by the addition of a vinyl monomer containing a hydroxyl group having two or more isocyanate groups in one molecule as disclosed in JP-B-48-41708 is exemplified.

The urethane acrylates as disclosed in JP-A-51-37193, JP-B-2-32293, JP-B-2-16765, and compounds having an ethylene oxide skeleton as disclosed in JP-B-58-49860, JP-B-56-17654, JP-B-62-39417 and JP-B-62-39418 are exemplified.

Further, radical polymerizable compounds having an amino structure or a sulfide structure in the molecule as disclosed in JP-A-63-277653, JP-A-63-260909 and JP-A-1-105238 may also be used.

As other examples, polyester acrylates, polyfunctional acrylates and methacrylates such as epoxy acrylates obtained by the reaction of epoxy resins and (meth)acrylic acids as disclosed in JP-A-48-64183, JP-B-49-43191 and JP-B-52-30490 are exemplified. Further, the specific unsaturated compounds disclosed in JP-B-46-43946, JP-B-1-40337 and JP-B-1-40336, and the vinyl phosphonic acid compounds disclosed in JP-A-2-25493 are also exemplified. In some cases, a structure having a perfluoroalkyl group disclosed in JP-A-61-22048 can be preferably used. The photo-curable monomers and oligomers described in *Nippon Setchaku Kyokaishi* (*Bulletin of Japan Adhesion Association*), Vol. 20, No. 7, pp. 300 to 308 (1984) can also be used.

Monofunctional or polyfunctional compounds containing fluorine, e.g., those disclosed in JP-A-2000-275403, paragraphs from [0059] to [0066] are also preferred.

Both radical polymerization initiators capable of generating radicals by the action of heat and light are usable in the invention.

As the compounds that initiate radical polymerization by the action of heat, organic and inorganic peroxides, organic azo, diazo compounds and onium compounds can be used.

Specifically, as organic peroxides, benzoyl peroxide, halogenobenzoyl peroxide, lauroyl peroxide, acetyl peroxide, dibutyl peroxide, cumene hydroperoxide and butyl hydro-peroxide, as inorganic peroxides, hydrogen peroxide, ammonium persulfate and potassium persulfate, as azo compounds, 2-azobisisobutyronitrile, 2-azobispropionitrile and 2-azobiscyclohexanedinitrile, as diazo compounds, diazoaminobenzene and p-nitrobenzenediazonium, and as onium compounds, the same compounds as described in the silyl reactive groups above are exemplified.

When compounds that initiate radical polymerization by the action of light are used, film is cured by the irradiation of actinic energy rays.

As the examples of such photo-radical polymerization initiators, acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums are used. The examples of acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-2-(4-morpholinophenyl)butanone. The examples of benzoins include benzoin-benzenesulfonic ester, benzoin-toluenesulfonic ester, benzoin methyl ether, benzoin ethyl ether and benzoin isopropyl ether. The examples of benzophenones include benzophenone, 2,4-dichlorobenzophenone, 4,4-dichlorobenzophenone, and p-chlorobenzophenone. The examples of phosphine oxides include 2,4,6-trimethylbenzoyl-diphenylphosphineoxide. Sensitizing dyes are preferably used in combination with these photo-radical polymerization initiators.

The addition amount of compounds that initiate radical polymerization by the action of heat or light should be sufficient to initiate polymerization of carbon-carbon double bond, but the amount is generally from 0.1 to 15 mass % of the total solid contents in the film-forming composition, more preferably from 0.5 to 5 mass %.

When these curing agents are used, similarly to the case of other curing agents, the addition amount is preferably from 0.5 to 300 mass parts or so per 100 mass parts of the block copolymer (BP), particularly preferably from 5.0 to 100 mass parts or so.

The film-forming composition of block copolymer (BP) of the invention is generally dissolved in a proper solvent. The concentration of block copolymer (BP) is appropriately selected according to purpose, but is generally from 0.01 to 60 mass %, preferably from 0.5 to 50 mass %, and particularly preferably from 1 to 20 mass %.

The solvent is not particularly restricted so long as the composition containing block copolymer (BP) of the invention is uniformly dissolved and dispersed without causing precipitation, and two or more solvents may be used in combination. The examples of preferred solvents include ketones (e.g., acetone, methyl ethyl ketone, methyl isobutyl ketone, cyclohexanone), esters (e.g., ethyl acetate, butyl acetate), ethers (e.g., tetrahydrofuran, 1,4-dioxane), alcohols (e.g., methanol, ethanol, isopropyl alcohol, butanol, ethylene glycol), aromatic hydrocarbons (e.g., toluene, xylene), and water.

The film-forming composition of the invention may further contain colloidal inorganic particles for the purpose of increasing film strength and coating property. As such colloidal inorganic particles, particles having a particle size of from 5 to 50 nm are used, preferably from 5 to 30 nm, and particularly preferably from 8 to 20 nm.

As inorganic particles, silica, alumina and magnesium fluoride are exemplified. Colloidal silica is preferably used. Colloidal silica can be prepared by hydrolysis and polycondensation with tetraalkoxysilane as the starting material and by using a catalyst such as aqueous ammonia according to the method described, e.g., in I. M. Thomas, *Appl. Opt.*, 25, 1481 (1986). As commercially available products, Snowtex IPA-ST, Snowtex MEK-ST (manufactured by Nissan Chemical Industries, Ltd.), and AEROSIL300, AEROSIL130 and AEROSIL50 (manufactured by NIPPON AEROSIL) can be used.

The addition amount of colloidal inorganic particles is from 5 to 95 mass % of the total solid contents of the film-forming composition after coating and curing, preferably 10 to 70 mass %, and particularly preferably from 20 to 60 mass %.

In addition to the above, additives, e.g., various silane coupling agents, surfactants, thickeners and leveling agents may be arbitrarily added to a film-forming composition, if necessary.

Layer Constitution of Anti-Reflection Film:

An anti-reflection film of the invention may be a monolayer comprising a low refractive index layer alone, or may be multilayer structure of the lamination of a middle refractive index layer, a high refractive index layer, and a hard coat layer. An anti-reflection film may be formed in advance and then arranged on an image display apparatus, or may be directly formed and arranged on an image display apparatus (on the site).

An anti-reflection film comprising two-layer lamination takes the layer constitution in the order of a transparent substrate, a high refractive index layer and a low refractive index layer (an outermost layer). A transparent substrate, a high refractive index layer and a low refractive index layer respectively have refractive indexes satisfying the following relationship:

The refractive index of a high refractive index layer> the refractive index of a transparent substrate> the refractive index of a low refractive index layer Further, a hard coat layer may be provided between a transparent substrate and a high refractive index layer. An anti-reflection film in the invention may comprise the later described high refractive index hard coat layer or an anti-glare high refractive index layer and a low refractive index layer.

An anti-reflection film comprising three-layer lamination takes the layer constitution in the order of a transparent substrate, a middle refractive index layer, a high refractive index layer and a low refractive index layer (an outermost layer). A transparent substrate, a middle refractive index layer, a high refractive index layer and a low refractive index layer respectively have refractive indexes satisfying the following relationship:

The refractive index of a high refractive index layer> the refractive index of a middle refractive index layer> the refractive index of a transparent substrate> the refractive index of a low refractive index layer Further, a hard coat layer may be provided between a transparent substrate and a middle refractive index layer. An anti-reflection film in the invention may comprise the later described middle refractive index hard coat layer, a high refractive index layer and a low refractive index layer.

For manufacturing an anti-reflection film having a superior anti-reflection property, it is preferred that each layer in such a multilayer constitution satisfy the relationship between layer thickness of each layer and visible ray wavelength as disclosed in JP-A-2001-188104.

High refractive index, middle refractive index and low refractive index described here mean relative high and low among the layers.

Low Refractive Index Layer:

In an anti-reflection film having the above layer constitution, a low refractive index layer formed by coating and curing at least the film-forming composition of the invention is used. A low refractive index layer of the invention comprises a resin layer (a polymer layer) formed by coating and curing the film-forming composition of the invention.

A low refractive index layer is generally the outermost layer of an anti-reflection film.

The refractive index of a low refractive index layer is preferably from 1.20 to 1.49, more preferably from 1.20 to 1.45, and particularly preferably from 1.20 to 1.43.

It is preferred for a low refractive index layer to contain inorganic compound fine particles having an average primary particle size of from 3 to 50 nm and a refractive index of 1.5 or less, more preferably an average primary particle size of from 5 to 40 nm and a refractive index of from 1.2 to 1.49. As the inorganic compound fine particles, compounds having a low refractive index, e.g., silicon dioxide (silica), fluorine-containing particles (magnesium fluoride, calcium fluoride and barium fluoride) are preferred. Silicon dioxide (silica) is particularly preferred. It is preferred that inorganic compound fine particles be dispersed finer. The configuration of inorganic fine particles is preferably ellipsoidal, spherical, cubic, spindle-like, short fibrous, ring-like or amorphous.

The thickness of a low refractive index layer is preferably from 10 to 400 nm, more preferably from 30 to 200 nm. The haze value of a low refractive index layer is preferably 3% or less, more preferably 2% or less, and most preferably 1% or less. The strength of a low refractive index layer is preferably H or higher by a pencil hardness test (JIS K5400) of a load of 1 kg, more preferably 2H or higher, and most preferably 3H or higher.

High Refractive Index Layer and Middle Refractive Index Layer:

When an anti-reflection film of the invention takes the mode of a multilayer film, a low refractive index layer and at least one layer having a higher refractive index than that of the low refractive index layer (i.e., a high refractive index layer, a middle refractive index layer) are generally used.

As the layer having a higher refractive index, well-known curable films containing at least high refractive index inorganic compound fine particles and a matrix binder are exemplified.

As the high refractive index inorganic compound fine particles, inorganic compounds having a refractive index of 1.65 or higher are used, preferably a refractive index of 1.9 or higher.

For example, oxides of Ti, Zn, Sb, Sn, Zr, Ce, Ta, La and In, and compound oxides containing these metals are exemplified as the inorganic compounds.

Particularly preferred inorganic fine particles are inorganic fine particles mainly comprising titanium dioxide containing at least one element selected from Co, Zr and Al (hereinafter sometimes referred to as "specific oxides").

A particularly preferred element is Co. The total content of Co, Al and Zr to Ti is preferably from 0.05 to 30 mass % to Ti, more preferably from 0.1 to 10 mass %, still more preferably from 0.2 to 7 mass %, particularly preferably from 0.3 to 5 mass %, and most preferably from 0.5 to 3 mass %.

Co, Al and Zr are present inside or on the surface of inorganic fine particles mainly comprising titanium dioxide. It is more preferred that these elements be present inside of inorganic fine particles mainly comprising titanium dioxide, and to be present both inside and on the surface is most preferred. These specific metal elements may be present in the form of oxides.

Other preferred inorganic particles are particles of compound oxide comprising a titanium element and at least one metal element selected from metal elements having a refractive index of 1.95 or higher (hereinafter sometimes abbreviated to "Met"), and the compound oxide is doped with at least one metal ion selected from Co ion, Zr ion and Al ion (hereinafter sometimes referred to as "specific double oxide"). As the metal elements of metal oxides having a refractive index of 1.95 or higher, Ta, Zr, In, Nd, Sb, Sn and Bi are preferred, Ta, Zr, Sn and Bi are particularly preferred. The content of metal ions to be doped to the compound oxide is preferably not more than 25 mass % of the total metal amount (Ti+Met) constituting the compound oxide in view of the maintenance of the refractive index. More preferably the content is from 0.05 to 10 mass %, still more preferably from 0.1 to 5 mass %, and most preferably from 0.3 to 3 mass %.

The doped metal ion may be present as a metal ion or a metal atom, and arbitrarily present from the surface to the inside of the compound oxide. The doped metal ion is preferably present both on the surface and inside of the compound oxide.

Inorganic fine particles for use in the invention preferably have a crystal structure. The crystal structure is preferably rutile, mixed crystal of rutile and anatase, anatase, or amorphous structure as a main component. It is particularly preferred that rutile structure is a main component.

By this crystal structure, specific oxides or inorganic fine particles of specific oxides of the invention have a refractive index of from 1.90 to 2.80, preferably from 2.10 to 2.80, and more preferably from 2.20 to 2.80. The photo catalytic activity of titanium dioxide can be suppressed by this crystal structure, thus the weatherproofness of a high refractive index layer can be conspicuously improved.

The specific metal element or metal ion can be doped by well-known methods, e.g., according to the methods described in JP-A-5-330825, JP-A-11-263620, JP-T-11-512336, EP 0335773, and ion doping methods (e.g., Shunichi Gonda, Junzo Ishikawa and Eiji Kamijo compiled, *Ion Beam Oyo Gijutsu* (*Ion Beam Applied Technology*), CMC Publishing Co. (1989), Ko Aoki, *Hyomen Kagaku* (*Superficial Science*), Vol. 18, No. 5, p. 262 (1998), Shoichi Anbo et al., *Hyomen Kagaku* (*Superficial Science*), Vol. 20, No. 2, p. 60 (1999)).

The average particle size of these inorganic compound particles is preferably from 1 to 100 nm. When the average particle size is 1 nm or less, the specific surface area becomes too great, so that the stability in a dispersion solution inferior. On the other hand, when the average particle size is 100 nm or more, scattering of visible rays occurs due to the difference in refractive indexes with the binder.

To obtain such super fine particles, it is preferred that the particle surfaces be treated with a surface treating agent (e.g., silane coupling agents disclosed in JP-A-11-295503, JP-A-11-153703 and JP-A-2000-9908, anionic compounds or organic metal coupling agents disclosed in JP-A-2001-310432), or inorganic fine particles have a core/shell structure with high refractive index particles as core (JP-A-2001-166104).

For ensuring the stability of a dispersion solution and the film strength after curing, it is preferred to make super fine particles with a dispersant by wet dispersing method. As dispersants for that purpose, dispersants such as anionic group-containing compounds and polymerizable group-containing anionic compounds are preferably used. For example, compounds disclosed in JP-A-11-153703, U.S. Pat. No. 6,210,858 and JP-A-2002-2776069 are exemplified.

As the organic materials for forming a matrix, a thermoplastic film (e.g., polystyrene, a polystyrene copolymer, polycarbonate, polymers having aromatic, heterocyclic or alicyclic ring groups other than polystyrene, polymers having hetero elements such as sulfur, nitrogen and phosphorus other than fluorine), a film composition (e.g., a film composition with a melamine film, a phenol film or an epoxy film as a curing agent), a urethane-forming composition (e.g., combinations of alicyclic or aromatic isocyanate and polyol), a radical and/or a cationic polymerizable polyfunctional composition (a modified film capable of polymerization reaction curing by introducing a double bond or a cationic polymerizable group to the above compounds (polymers), or a composition containing the prepolymer), an organic metal compound containing a hydrolyzable group, and a partial condensation composition of the organic metal compound are exemplified. Any of these film-forming compositions may be used, but a material having a high film-forming property is preferred.

At least one composition selected from a polyfunctional compound containing at least two radical polymerizable and/or cationic polymerizable groups, an organic metal compound containing a hydrolyzable group, and a partial condensation composition of the organic metal compound is preferred. For example, the compounds disclosed in JP-A-2001-315242, JP-A-2001-31871 and JP-A-2001-296401 are exemplified.

These film-forming compositions are preferably used with a polymerizable compound, a polymerization initiator, a sensitizer, an organic metal compound and a catalyst for condensation reaction. Specifically, the compounds described in the above literatures are exemplified.

Colloidal metal oxides obtained from hydrolyzed and condensed products of metal alkoxides and curable films obtained from metal alkoxide compositions are also preferred. These compounds are disclosed, e.g., in JP-A-2001-293818.

The refractive index of a high refractive index layer is generally from 1.50 to 2.50, preferably from 1.65 to 2.40, and more preferably from 1.70 to 2.20.

The thickness of a high refractive index layer is preferably from 5 nm to 10 µm, more preferably from 10 nm to 3 µm. The haze value of a high refractive index layer is preferably 5% or less, more preferably 3% or less, and most preferably 1% or less. The strength of a high refractive index layer is preferably H or higher by a pencil hardness test of a load of 1 kg, more preferably 2H or higher, and most preferably 3H or higher.

For manufacturing an anti-reflection film having a higher anti-reflection property, it is preferred to provide a middle refractive index layer having a refractive index between the refractive index of a high refractive index layer and the refractive index of a transparent substrate.

The refractive index of a middle refractive index layer is adjusted so as to be the value between the refractive index of a low refractive index layer and the refractive index of a high refractive index layer.

It is particularly preferred to use inorganic fine particles and a polymer in a high refractive index layer and the refractive index of a middle refractive index layer is adjusted to be rather lower than that of a high refractive index layer.

It is preferred to manufacture a middle refractive index layer in the same manner as described in a high refractive index layer, and the refractive index of a middle refractive index layer can be adjusted by controlling the content of inorganic fine particles in the film.

A middle refractive index layer has a thickness of from 0.03 to 5 μm, preferably from 0.05 to 0.5 μm, and more preferably from 0.05 to 0.3 μm. The haze value of a middle refractive index layer is preferably the lower, preferably 5% or lower, more preferably 3% or lower, and particularly preferably 1% or lower.

Hard Coat Layer:

A hard coat layer is provided on the surface of a transparent substrate for the purpose of giving physical strength to an anti-reflection film. It is particularly preferred to provide a hard coat layer between a transparent substrate and a high refractive index layer.

A hard coat layer is preferably formed by a crosslinking reaction or polymerization reaction of an ionizing radiation-curable compound. For example, a hard coat layer can be formed by coating, on a transparent substrate, a coating composition containing an ionizing radiation-curable polyfunctional monomer and polyfunctional oligomer to thereby subject the polyfunctional monomer and polyfunctional oligomer to a crosslinking reaction or polymerization reaction.

As the functional groups of the ionizing radiation-curable polyfunctional monomers and polyfunctional oligomers, photo-, electron beam- and radiation-polymerizable functional groups are preferred, and photo-polymerizable functional groups are preferred above all.

As photo-polymerizable functional groups, unsaturated polymerizable functional groups, e.g., a (meth) acryloyl group, a vinyl group, a styryl group and an allyl group are exemplified, and a (meth)acryloyl group is particularly preferred.

As the photo-polymerizable polyfunctional monomers having a photo-polymerizable functional group, the same compounds as shown in a high refractive index layer are exemplified, and it is preferred to perform polymerization with a photo-polymerization initiator and a photo-sensitizer. Photo-polymerization reaction is preferably performed with ultraviolet irradiation after coating a hard coat layer and drying.

It is preferred for a hard coat layer to contain inorganic fine particles having an average primary particle size of 200 nm or less. An average particle size used here is a weight average particle size. By making an average primary particle size 200 nm or less, a hard coat layer can be formed without impairing transparency.

Inorganic fine particles make the hardness of a hard coat layer high and, at the same time, suppress curing shrinkage of a coated layer. Inorganic fine particles are also added for the purpose of controlling the refractive index of a hard coat layer.

As inorganic fine particles, in addition to the inorganic fine particles shown in a high refractive index layer, fine particles of silicon dioxide, aluminum oxide, calcium carbonate, barium sulfate, talc, kaolin, calcium sulfate, titanium dioxide, zirconium oxide, tin oxide, ITO ($In_2O_3$ doped with $SnO_2$) and zinc oxide are exemplified. Of these fine particles, silicon dioxide, titanium dioxide, zirconium oxide, aluminum oxide, tin oxide, ITO and zinc oxide are preferred.

The average primary particle size of inorganic fine particles is preferably from 5 to 200 nm, more preferably from 10 to 150 nm, still more preferably from 20 to 100 nm, and particularly preferably from 20 to 50 nm.

Inorganic fine particles are preferably dispersed as fine as possible in a hard coat layer.

The particle size of inorganic fine particles in a hard coat layer is preferably from 5 to 300 nm on the average, more preferably from 10 to 200 nm, still more preferably from 20 to 150 nm, and particularly preferably from 20 to 80 nm.

The content of inorganic fine particles in a hard coat layer is preferably from 10 to 90 mass % of the total mass of the hard coat layer, more preferably from 15 to 80 mass %, and particularly preferably from 15 to 75 mass %.

A high refractive index layer can double as a hard coat layer. When a high refractive index layer also serves as a hard coat layer, it is preferred to form a hard coat layer by finely dispersing inorganic fine particles having a high refractive index and adding to a hard coat layer by the method as described in a high refractive index layer.

A hard coat layer can also double an anti-glare layer by containing later-described particles having an average particle size of from 0.2 to 10 μm.

The thickness of a hard coat layer can be appropriately designed according to purpose. The thickness of a hard coat layer is preferably from 0.2 to 10 μm, more preferably from 0.5 to 7 μm, and particularly preferably from 0.7 to 5 μm.

The strength of a hard coat layer is preferably H or higher by a pencil hardness test according to JIS K5400, more preferably 2H or higher, and most preferably 3H or higher.

Further, in Taber's test according to JIS K6902, the smaller the abrasion amount of a sample piece before and after the test, the better is the sample.

When a hard coat layer is formed by a crosslinking reaction or polymerization reaction of an ionizing radiation-curable compound, the crosslinking reaction or polymerization reaction is preferably performed in the atmosphere of oxygen concentration of 10 vol % or less. A hard coat layer excellent in physical strength and chemical resistance can be formed by performing the reaction in the atmosphere of oxygen concentration of 10 vol % or less.

It is preferred to perform the crosslinking reaction or polymerization reaction of an ionizing radiation-curable compound in the atmosphere of oxygen concentration of 6 vol % or less, more preferably 4 vol % or less, particularly preferably 2 vol % or less, and most preferably 1 vol % or less.

As a means to make oxygen concentration 10 vol % or less, it is preferred to replace the atmosphere (nitrogen concentration: about 79 vol % and oxygen concentration: about 21 vol %) with another gas, and a particularly preferred means is to replace the atmosphere with nitrogen gas (nitrogen purge).

It is preferred to form a hard coat layer by coating a coating composition for hard coat forming on the surface of a transparent substrate.

As coating solvents, the ketone solvents as shown in the film-forming composition are preferred. The adhesion of the surface of a transparent substrate (in particular, a triacetyl cellulose support) and a hard coat layer is further improved by using ketone solvents.

Particularly preferred solvents are methyl ethyl ketone, methyl isobutyl ketone and cyclohexanone.

The coating solvent of a hard coat layer may contain the solvents other than the ketone solvents shown in the film-forming composition.

The content of a ketone solvent in a coating solvent is preferably 10 mass % or more of the total solvents contained in a coating composition, more preferably 30 mass % or more, and still more preferably 60 mass % or more.

Surface Unevenness of Anti-Reflection Film:

An anti-reflection film for use in the invention can be provided with unevenness on the surface of the side having a low refractive index layer for the purpose of giving anti-glare.

Anti-glare correlates with the average surface roughness (Ra) of the surface of an anti-reflection film. An area of 1 mm$^2$ is randomly taken out from the area of 100 cm$^2$ of a film, and it is preferred that the average surface roughness (Ra) per 1 mm$^2$ of the surface taken out be from 0.01 to 0.4 µm, more preferably from 0.03 to 0.3 µm, still more preferably from 0.05 to 0.25 µm, and particularly preferably from 0.07 to 0.2 µm.

Average surface roughness (Ra) is described in Jiro Nara, *Hyomen Arasa no Sokutei-ho, Hyoka-ho* (*Measurement and Evaluation of Surface Roughness*), Techno Compact Series (6), published by Sogo Gijutsu Center.

The configurations of the concavities and convexities of the surface of an anti-reflection film for use in the invention can be evaluated with an atomic force microscope (AFM).

Surface unevenness can be formed by well-known methods. In the present invention, a method of forming unevenness by pressing a plate having concavities and convexities on a film surface with high pressure (e.g., embossing process), and a method of adding particles to any layer of an anti-reflection film to make an anti-glare layer, thereby forming unevenness on the surface of the anti-reflection film are preferably used.

Although well-known methods can be used in embossing process to form unevenness on the surface of a film, it is particularly preferred to form unevenness by the method disclosed in JP-A-2000-329905.

To form an anti-glare layer by adding particles to any layer of an anti-reflection film, the particles preferably have an average particle size of from 0.2 to 10 µm. An average particle size used here is a weight average particle size of secondary particles (when particles are not agglomerated, primary particles).

In organic particles and organic particles are exemplified as the particles. The specific examples of inorganic particles include particles of silicon dioxide, titanium dioxide, zirconium oxide, aluminum oxide, tin oxide, ITO, zinc oxide, calcium carbonate, barium sulfate, talc, kaolin and calcium sulfate are exemplified. Silicon dioxide and aluminum oxide are preferred.

Resin particles are preferred as organic particles. The specific examples of resin particles include particles made from silicone resin, melamine resin, benzoguanamine resin, polymethyl methacrylate resin, polystyrene resin, and polyvinylidene fluoride resin. Particles made from melamine resin, benzoguanamine resin, polymethyl methacrylate resin and polystyrene resin are preferred, and particles made from polymethyl methacrylate resin, benzoguanamine resin and polystyrene resin are particularly preferred.

As the particles for use in an anti-glare layer for forming unevenness, resin particles are preferred.

The average particle size of the particles is preferably from 0.5 to 7.0 µm, more preferably from 1.0 to 5.0 µm, and particularly preferably from 1.5 to 4.0 µm.

The refractive index of the particles is preferably from 1.35 to 1.80, more preferably from 1.40 to 1.75, and still more preferably from 1.45 to 1.75.

The particle size distribution of the particles is preferably narrower. An S value showing the particle size distribution of particles is represented by the following equation, and S value is preferably 2 or lower, more preferably 1.0 or lower, and particularly preferably 0.7 or lower.

$$S=[D(0.9)-D(0.1)]/D(0.5)$$

D (0.1): 10% equivalent particle size of the integrated value of particle size in terms of the volume D (0.5): 50% equivalent particle size of the integrated value of particle size in terms of the volume D (0.9): 90% equivalent particle size of the integrated value of particle size in terms of the volume The refractive index of particles is not especially restricted, but it is preferred that the refractive index be almost equal to that of an anti-glare layer (the difference in refractive indexes by 0.005 or less), or differ by 0.02 or more.

The contrast at the time when an anti-reflection film is arranged on an image display apparatus is improved by making the refractive indexes of particles and an anti-glare layer almost equal.

By making difference between the refractive index of particles and the refractive index of an anti-glare layer, the visibility (glare failure and characteristics of angle of visibility) is improved when an anti-reflection film is mounted on a liquid crystal display.

When difference is made between the refractive index of particles and the refractive index of an anti-glare layer, the difference is preferably from 0.03 to 0.5, more preferably from 0.03 to 0.4, and particularly preferably from 0.05 to 0.3.

Particles for giving anti-glare can be added to any layer provided on an anti-reflection film, preferably a hard coat layer, a low refractive index layer, or a high refractive index layer, and particularly preferably particles are added to a hard coat layer or a high refractive index layer. Particles may be added to a plurality of layers.

Other Layers of Anti-Reflection Film:

Layers other than the above layers may be provided on an anti-reflection film. For instance, an adhesive layer, a shield layer, a sliding layer and an antistatic layer may be provided. A shield layer is provided for shielding electromagnetic wave and infrared rays.

When an anti-reflection film is applied to a liquid crystal display, an undercoat layer containing particles having an average particle size of from 0.1 to 10 µm can be newly formed for the purpose of the improvement of the characteristics of angle of visibility. An average particle size used here is a weight average particle size of secondary particles (when particles are not agglomerated, primary particles). The average particle size of the particles is preferably from 0.2 to 5.0 µm, more preferably from 0.3 to 4.0 µm, and particularly preferably from 0.5 to 3.5 µm.

The refractive index of the particles is preferably from 1.35 to 1.80, more preferably from 1.40 to 1.75, and still more preferably from 1.45 to 1.75.

The particle size distribution of the particles is preferably narrower. An S value showing the particle size distribution of particles is shown by the above equation, and S value is preferably 1.5 or lower, more preferably 1.0 or lower, and particularly preferably 0.7 or lower It is preferred that the difference between the refractive index of particles and the refractive index of an undercoat layer be 0.02 or higher, more preferably from 0.03 to 0.5, still more preferably 0.05 to 0.4, and particularly preferably from 0.07 to 0.3.

Inorganic particles and organic particles described in an anti-glare layer can be used in an undercoat layer.

An undercoat layer is preferably provided between a hard coat layer and a transparent substrate. Undercoat layer can double a hard coat layer.

When particles having an average particle size of from 0.1 to 10 μm are added to an undercoat layer, the haze value of the undercoat layer is preferably from 3 to 60%, more preferably from 5 to 50%, still more preferably from 7 to 45%, and particularly preferably from 10 to 40%.

Transparent Substrate:

It is preferred for an anti-reflection film to have a transparent substrate (a transparent support) exclusive of the case where an anti-reflection film is directly provided on a CRT image display apparatus and the surface of a lens. The light transmittance of a transparent substrate is preferably 80% or more, more preferably 86% or more. The haze value of a transparent substrate is preferably 2.0% or less, more preferably 1.0% or less. The refractive index of a transparent substrate is preferably from 1.4 to 1.7.

As a transparent substrate, plastic films are preferred to a glass plate. The examples of the materials of plastic films include cellulose ester, polyamide, polycarbonate, polyester (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefin (e.g., polypropylene, polyethylene, polymethylpentene), polysulfone, polyether sulfone, polyallylate, polyether imide, polymethyl methacrylate and polyether ketone. Of these, cellulose ester, polycarbonate, polyethylene terephthalate and polyethylene naphthalate are preferred.

In particular, when a transparent substrate is used in a liquid crystal display, cellulose triacylate film is preferably used. Cellulose triacylate is manufactured from cellulose by esterification. Not that the above particularly preferred celluloses are used as they are, but linters, kenafs and pulps are refined and used.

In the present invention, cellulose acylate means fatty acid ester of cellulose. Lower fatty acid esters are preferred, and fatty acid ester film of cellulose is particularly preferred.

Lower fatty acid means fatty acid having 6 or less carbon atoms. Cellulose acylate having from 2 to 4 carbon atoms is preferred. Cellulose acetate is particularly preferred. It is also preferred to use mixed fatty acid esters, e.g., cellulose acetate propionate and cellulose acetate butyrate.

The viscosity average polymerization degree (DP) of cellulose acylate is preferably 250 or more, more preferably 290 or more. The molecular weight distribution of Mw/Mn (Mw is a mass average molecular weight and Mn is a number average molecular weight) of cellulose acylate by gel permeation chromatography is preferably narrow. The specific value of Mw/Mn is preferably from 1.0 to 3.0.

As the transparent substrate of the invention, it is preferred to use cellulose acylate having the degree of acetylation of from 55.0 to 62.5%, more preferably from 57.0 to 62.0%, and particularly preferably from 59.0 to 61.5%. The degree of acetylation means the bound amount of acetic acid per cellulose unit mass. The degree of acetylation is obtained by the measurement of the degree of acylation in ASTM D-817-91 (a test method of cellulose acylate) and computation.

In cellulose acylate, the hydroxyl groups at the 2-, 3- and 6-positions are not uniformly substituted but the degree of substitution at the 6-position is liable to become small. It is preferred that the degree of substitution of cellulose at the 6-position of cellulose acylate for use in the invention is the same degree or greater as compared with the 2- and 3-positions.

The ratio of the degree of substitution at the 6-position to the sum total of the degree of substitution at the 2-, 3- and 6-positions is preferably from 30 to 40%, more preferably from 31 to 40%, and most preferably from 32 to 40%.

Various additives can be used in a transparent substrate for adjusting the characteristics of a film, such as mechanical characteristics (film strength, curling, dimensional stability and sliding properties) and durability (moisture resistance, heat resistance and weather-proofness). For example, plasticizers (e.g., phosphoric esters, phthalic esters, and esters of polyol and fatty acid), UV preventives (e.g., hydroxybenzophenone compounds, benzotriazole compounds, salicylic ester compounds and cyano acrylate compounds), deterioration preventives (e.g., antioxidants, peroxide decomposers, radical inhibitors, metal inactivators, acid catchers and amine), fine particles (e.g., $SiO_2$, $Al_2O_3$, $TiO_2$, $BaSO_4$, $CaCO_3$, $MgCO_3$, talc and kaolin), removers, antistatic agents, and infrared absorbers are exemplified as such additives.

The details of these additives are described in Hatsumei Kyokai Kokai Giho Kogi No. 2001-1745 (published by Matsumei Kyokai, Mar. 15, 2001), pp. 17 to 22, and the materials described therein are preferably used.

The use amount of additives is preferably from 0.01 to 20 mass % of the transparent substrate, more preferably from 0.05 to 10 mass %.

A transparent substrate may be subjected to surface treatment.

The examples of to surface treatments include chemical treatment, mechanical treatment, corona discharge treatment, flame treatment, UV treatment, high frequency treatment, glow discharge treatment, active plasma treatment, laser treatment, mixed acid treatment and ozone oxidation treatment. Specifically, the contents in Hatsumei Kyokai Kokai Giho Kogi No. 2001-1745 (published on Mar. 15, 2001), pp. 30 and 31, and JP-A-2001-9973 are exemplified.

The preferred surface treatments are glow discharge treatment, UV treatment, corona discharge treatment and flame treatment, and more preferred treatments are glow discharge treatment and UV treatment.

Forming Method of Anti-Reflection Film:

Each layer constituting an anti-reflection film is preferably manufactured by coating. Dip coating, air knife coating, curtain coating, roller coating, wire bar coating, gravure coating, micro gravure coating, and extrusion coating (U.S. Pat. No. 2,681,294) can be used for coating each layer. Two or more layers maybe coated simultaneously. Simultaneous coating methods are disclosed in U.S. Pat. Nos. 2,761,791, 2,941,898, 3,508,947, 3,526,528, and Yuji Harasaki, *Coating Kogaku* (*Coating Engineering*), p. 253, Asakura Shoten (1973). Wire bar coating, gravure coating and micro gravure coating are preferably used.

To each layer of an anti-reflection film, resins, dispersants, surfactants, antistatic agents, silane coupling agents, thickeners, coloring preventives, colorants (pigments and dyes), defoaming agents, leveling agents, flame retardants, U absorbers, adhesion assistants, polymerization inhibitors, antioxidants and surface improvers can be added besides the above described fine particles, polymerization initiators and photo-sensitizers.

Physical Properties of Anti-Reflection film:

It is preferred for an anti-reflection film in the invention to have a dynamic friction coefficient of the surface of the side having a low refractive index layer of 0.25 or less for improving physical strength (scratch resistance and the like). When a stainless steel ball having a diameter of 5 mm applied with a load of 0.98 N is moved at a velocity of 60 cm/minute on the surface of the side having a low refractive index layer, the friction coefficient between the surface of the side having a low refractive index layer and the stainless steel ball having a diameter of 5 mm is a dynamic friction coefficient described here. The dynamic friction coefficient of an anti-reflection film is preferably 0.17 or less, particularly preferably 0.15 or less.

For improving the anti-pollution property of an anti-reflection film, it is preferred that the surface of the side having a low refractive index layer of an anti-reflection film have the contact angle to water of 90° or more, more preferably 95° or more, and particularly preferably 1000° or more.

When an anti-reflection film does not have an anti-glare property, a haze value is preferably the lower.

When an anti-reflection film has an anti-glare property, a haze value is preferably from 0.5 to 50%, more preferably from 1 to 40%, and most preferably from 1 to 30%.

Protective Film for Polarizing Plate:

When an anti-reflection film of the invention is used as a protective film for a polarizing film (a protective film for a polarizing plate), it is preferred that the surface of a transparent substrate opposite to the side having a low refractive index layer, that is, the side to be adhered with a polarizing film, have the contact angle to water of 40° or less, to thereby sufficiently increase the adhesion with a polarizing film.

A triacetyl cellulose film is preferably used as a transparent substrate.

A protective film for a polarizing plate in the invention is manufactured by the following methods.

(1) A method of coating the above each layer (e.g., a hard coat layer, a high refractive index layer, a low refractive index layer) on one side of a transparent substrate having been subjected to saponification treatment.

(2) A method of coating the above each layer (e.g., a hard coat layer, a high refractive index layer, a low refractive index layer) on one side of a transparent substrate, and then subjecting the side of a transparent substrate to be adhered with a polarizing film to saponification treatment.

It is also possible to coat a saponification treatment solution on the surface of a transparent substrate to be adhered with a polarizing film of an anti-reflection film to thereby perform saponification.

It is preferred that a protective film for a polarizing plate satisfy the performances described in an anti-reflection film in optical performance (anti-reflection performance, anti-glare performance), physical performance (scratch resistance), chemical resistance, anti-pollution performance (pollution resistance), and waterproofness (humidity and heat resistance, light fastness).

Surface Treatment:

The hydrophilization treatment of the surface of a transparent substrate can be performed by well-known methods. For example, methods of improving the film surface of a transparent substrate by corona discharge treatment, glow discharge treatment, UV treatment, flame treatment, ozone treatment, acid treatment and alkali treatment are exemplified. These treatments are described in detail in Hatsumei Kyokai Kokai Giho Kogi No. 2001-1745 (published on Mar. 15, 2001), pp. 30 to 32. Of these treatments, alkali saponification treatment is particularly preferred and extremely effective as surface treatment when a cellulose acylate film is used as a transparent substrate.

It is preferred to perform saponification treatment by soaking a transparent substrate in an alkali solution or an anti-reflection film for a proper period of time, or coating an alkali solution. Alkali solutions and treatments are disclosed in JP-A-2002-82226 and WO 02/46809. It is preferred to perform saponification treatment so that the contact angle to water of the film surface becomes 45°.

A protective film for a polarizing plate is used by adhering the polarizing film to the hydrophilized surface of a transparent substrate.

Polarizing Plate:

A polarizing plate has an anti-reflection film at least on one side of a protective film for a polarizing film (a protective film for a polarizing plate). It is preferred that the surface of a transparent substrate opposite to the side having a low refractive index layer, that is, the side to be adhered with a polarizing film, have the contact angle to water of 40° or less.

By using an anti-reflection film as a protective film for a polarizing plate, a polarizing plate having an anti-reflection function can be manufactured, which results in the drastic cost reduction and contributes to thinning of a display.

Further, by manufacturing a polarizing plate having an anti-reflection film on one side of a protective film for a polarizing plate and a later-described optical compensation film having an optical anisotropy on the other side of a protective film for a polarizing plate, a polarizing plate capable of improving the contrast of a liquid crystal display in a bright room and capable of widening the angle of visibility in both upward, downward and left side, right side directions can be obtained.

Optical Compensation Film:

An optical compensation film (a phase contrast film) can improve characteristics of angle of visibility of a liquid crystal display.

Well-known optical compensation films can be used, but in the point of widening angle of visibility it is preferred to use the optical compensation film disclosed, which has an optical compensation film comprising a compound having a discotic structural unit, and the angle formed by the discotic compound and the support varies to the depth direction of the layer.

It is preferred the angle increases with the increase of the distance from the side face of the support of the optical anisotropic layer.

When an optical compensation film is used as a protective film of a polarizing film, it is preferred that the surface of the side to be adhered with a polarizing film be subjected to saponification treatment, e.g., according to the above saponification treatment.

Image Display Apparatus:

An anti-reflection film can be applied to image display apparatuses, e.g., liquid crystal display (LCD), plasma display panel (PDP), electroluminescence display (ELD) and cathode ray tube (CRT). The transparent substrate side of an anti-reflection film is preferably adhered to the image display surface of an image display apparatus. The polarizing film side of a polarizing plate is preferably to the image display surface of an image display apparatus.

An anti-reflection film and a polarizing plate of the invention can be preferably used in transmission type, reflection type and semi-transmission type liquid crystal displays of the modes of twisted nematic (TN), super twisted nematic (STN), vertical alignment (VA), in-plane switching (IPS), and optically compensated bend cell (OCB).

When an anti-reflection film and a polarizing plate are used in transmission type and semi-transmission type liquid crystal displays, a display having further high visibility can be obtained by the use in combination with commercially available luminance increasing films (polarization separation films having a polarization selecting layer, e.g., D-BEF manufactured by Sumitomo 3M Limited).

Further, by combining with λ/4 plates, an anti-reflection film and a polarizing plate of the invention can be used as a polarizing plate for reflection type liquid crystal and a surface protective plate for an organic EL display to reduce the reflected light from the surface and the inside.

EXAMPLE

The present invention is described below with reference to examples but the invention is not limited thereto.

Synthesis of Block Copolymer:

Synthesis Example 1 of Block Copolymer (BPF): Block Copolymer (BPF-1):

A mixture comprising 8.5 mass parts of monofunctional siloxane-containing oligomer (SO-1) having the following structure, 0.15 mass part of methanesulfonic acid, and 135 mass parts of toluene was stirred at room temperature (25° C. for 1 hour. In the next place, to the mixture was added 50 mass parts of perfluorocycloolefin copolymer (FP-1) having the following structure synthesized by the same method as the experiment described in J. Am. Chem. Soc., 116 (No. 9), 4135 (1994), and the mixture was further stirred for 10 hours.

The reaction product was reprecipitated in 750 ml of ligroin, the precipitate was collected and dried under reduced pressure, thereby 50 mass parts in yield of a product was obtained.

The mass average molecular weight of the obtained polymer was $7 \times 10^4$ (measurement value by GPC in terms of polystyrene). Further, a peak corresponding to the monofunctional siloxane-containing oligomer (SO-1) was not observed by GPC histogram.

Perfluorocycloolefin copolymer (FP-1)

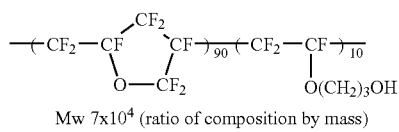

Mw $7 \times 10^4$ (ratio of composition by mass)

Monofunctional siloxane-containing oligomer (SO-1)

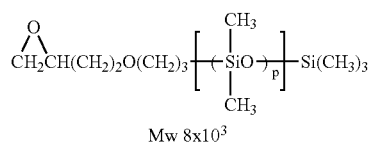

Mw $8 \times 10^3$

Block copolymer (BPF-1)

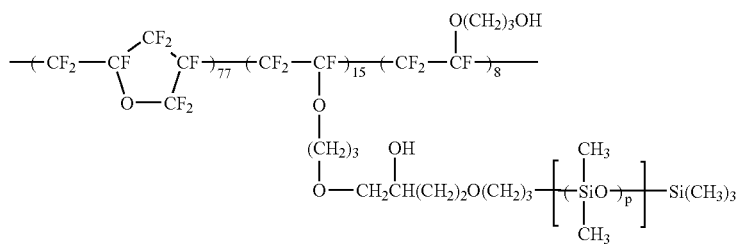

Synthesis Example 2 of Block Copolymer (BPF): Block Copolymer (BPF-2):

A mixture comprising 50 mass parts of perfluorocycloolefin copolymer (FP-2) having the following structure, 7.5 mass parts of monofunctional siloxane-containing oligomer (SO-2) having the following structure, and 135 parts of xylene was heated at 120° C., and then 0.01 mass part of dodecyl-dimethylamine was added and the mixture was stirred for 8 hours. After being cooled to room temperature, the mixture was reprecipitated in 800 ml of petroleum ether, the precipitate was collected and dried under reduced pressure, thereby 48 mass parts in yield of a product was obtained. The Mw of the obtained polymer was $5 \times 10^4$.

Further, a peak corresponding to the monofunctional siloxane-containing oligomer (SO-2) was not observed by GPC histogram.

Perfluorocycloolefin copolymer (FP-2)    Monofunctional siloxane-containing oligomer (SO-2)

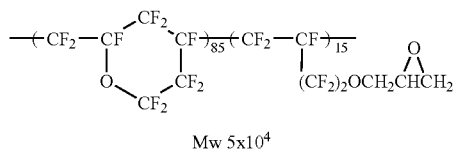
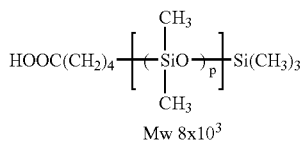

Block copolymer (BPF-2)

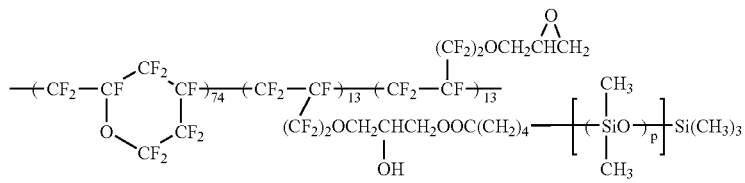

Synthesis Example 3 of Block Copolymer (BPF): Block Copolymer (BPF-3):

A mixture comprising 50 mass parts of perfluorocycloolefin copolymer (FP-3) having the following structure, 12.5 mass parts of monofunctional siloxane-containing oligomer (SO-3) having the following structure, and 140 mass parts of fluorine solvent Fluorinert FC-75 (manufactured by Sumitomo 3M Limited) was stirred. Subsequently, a mixed solution comprising 2 mass parts of N,N-dicyclohexylcarbodiimide (abbreviation: D.C.C.), 0.05 mass part of 4-(N, N-dimethylamino)pyridine and 5 mass parts of methylene chloride was dripped for 10 minutes, followed by stirring for 1 hour. The temperature was raised to 40° C. and stirring was continued for further 4 hours.

To the reaction solution was added 1 mass part of formic acid and the solution was stirred for 2 hours, and the precipitate was filtered through sellaite. The filtrate was reprecipitated in 800 ml of n-hexane and the precipitate was collected, dried under reduced pressure, thereby 51 mass parts in yield of a product was obtained. The Mw of the obtained polymer was $7\times10^4$.

A peak corresponding to the monofunctional siloxane-containing oligomer (SO-3) was not observed by GPC histogram.

Perfluorocycloolefin copolymer (FP-3)    Monofunctional siloxane-containing oligomer (SO-3)

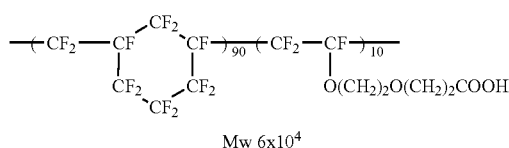
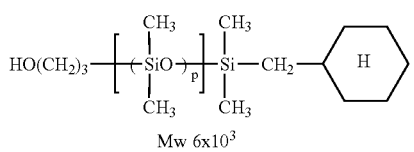

Block copolymer (BPF-3)

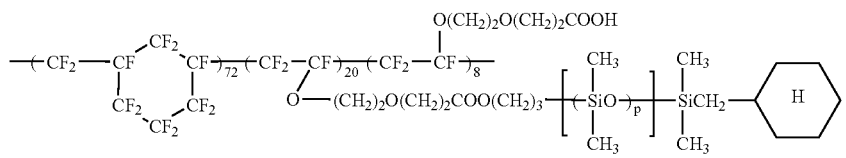

Synthesis Example 4 of Block Copolymer (BPF): Block Copolymer (BPF-4):

A mixture comprising 20 mass parts of block copolymer (BPF-1) obtained in the above Synthesis Example 1, 2.5 mass parts of 2-[2-(carboxyethylcarbonyloxo)]ethyl methacrylate and 37 mass parts of tetrahydrofuran was stirred at room temperature and dissolved. Subsequently, a mixed solution comprising 1.0 mass part of D.C.C., 0.01 mass part of 4-(N,N-dimethylamino) pyridine and 3 mass parts of tetrahydrofuran was dripped for 5 minutes, followed by stirring for 2 hours. The temperature was raised to 35° C. and stirring was continued for further 3 hours.

To the reaction solution was added 1 mass part of formic acid and the solution was stirred for 3 hours, and the precipitate was filtered through sellaite. The filtrate was reprecipitated in 150 ml of n-hexane and the precipitate was collected, dried under reduced pressure, thereby 15 mass parts a product having Mw of $7 \times 10^4$ was obtained.

Heating was stopped and the reaction solution was allowed to cool. The reaction solution was taken out of the autoclave and reprecipitated in 1.0 liter of n-hexane. The precipitate was collected, dried under reduced pressure, thereby 34 mass parts of a product having Mw of $5 \times 10^4$ was obtained.

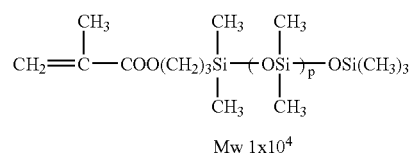

Monofunctional siloxane-containing macro-monomer (MM-1)

Mw $1 \times 10^4$

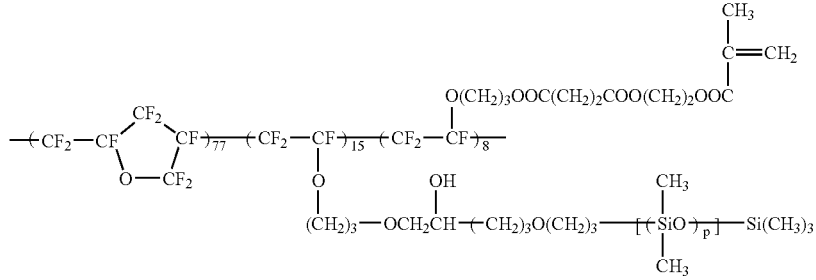

Block copolymer (BPF-4)

Synthesis Example 5 of Block Copolymer (BPF): Block Copolymer (BPF-5):

Perfluorodiallyl ether (26.0 mass parts), 10.0 mass parts of monofunctional siloxane-containing macro monomer (MM-1) having the following structure, 4.0 mass parts of 2-hydroxyethylperfluorovinyl ether, and 75 mass parts of toluene were put in an autoclave, and the autoclave was thoroughly deaerated. To the autoclave was added 0.8 mass part of a polymerization initiator diisopropylperoxy dicarbonate (hereinafter abbreviated to IPP) and the reaction mixture was stirred at 40° C. for 8 hours. Further, 0.5 mass part of IPP was added thereto, the autoclave was thoroughly deaerated, and the mixture was stirred for 8 hours at 55° C.

-continued

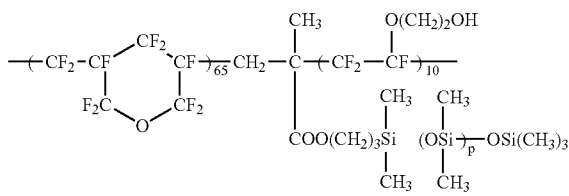

Graft copolymer (BPF-5)

Synthesis Examples 6 to 8 of Block Copolymers (BPF): Block Copolymers (BPF-6 to 8):

Each polymer shown in Table 1 below was synthesized in the same manner as in the synthesis of block copolymer (BPF-5). The yield of each polymer was from 35 to 38 mass parts, and Mw was from $4 \times 10^4$ to $7 \times 10^4$.

TABLE 1

| Synthesis Example | Copolymer (BPF) | Block Copolymer (BPF) (composition ratio by mass) |
|---|---|---|
| 6 | BPF-6 | 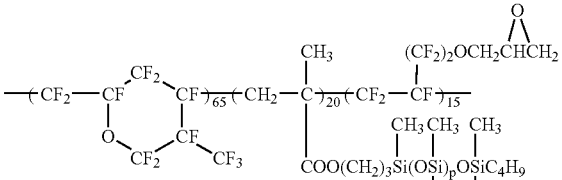 (Mw of graft moiety: $8 \times 10^3$) |
| 7 | BPF-7 | 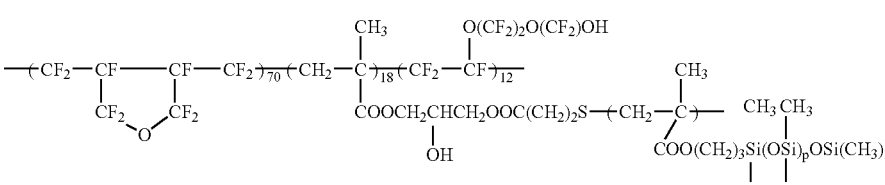 (Mw of graft moiety: $1.2 \times 10^4$) |
| 8 | BPF-8 | 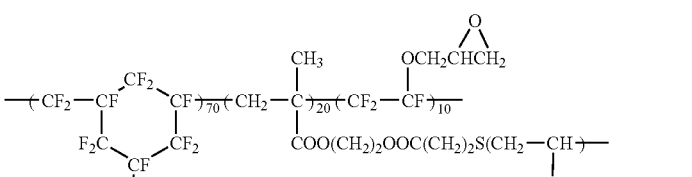 (Mw of graft moiety: $1 \times 10^4$) Y: —OSi(CH$_3$)$_3$ |

Synthesis Example 1 of Block Copolymer (BPS): Block Copolymer (BPS-1):

A mixture comprising perfluoroallylvinyl ether (40 mass parts), 10.0 mass parts of monomer (F-1) having the structure shown below, 0.5 mass part of 3-mercaptopropionic acid, and 100 mass parts of Florinate FC-75 was put an autoclave, and the autoclave was thoroughly deaerated. The temperature was raised to 45° C., and 0.75 mass parts of IPP was added thereto, followed by stirring for 8 hours. Further, 0.5 mass part of IPP was added and the reaction solution was stirred at 50° C. for 8 hours. The reaction solution was allowed to cool to room temperature, and then reprecipitated in 800 ml of methanol, the precipitate was collected, dried under reduced pressure, thereby 42 mass parts in yield of a product having Mw of $8\times10^3$ was obtained.

A mixture comprising 40 mass parts of the above-obtained product, 2.5 mass parts of glycidyl methacrylate, 0.05 mass part of dodecyldimethylamine, 0.01 mass part of 2,4-di-t-butyl hydroquinone, and 80 mass parts of toluene was stirred at 110° C. for 6 hours. After being cooled to room temperature, the reaction solution was reprecipitated in 700 ml of toluene, the precipitate was collected and dried under reduced pressure, thereby 34 mass parts in yield of a product having Mw of $8.5\times10^3$ was obtained.

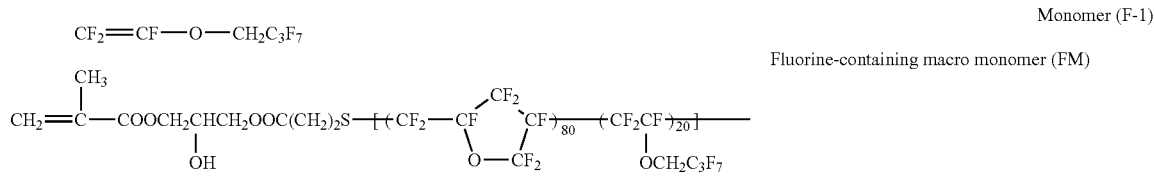

Monomer (F-1)

Fluorine-containing macro monomer (FM)

Synthesis of Block Copolymer (BPS-1):

A mixture comprising 55 mass parts of monomer (S) having the structure shown below, 30 mass parts of the above macro monomer (FM), 15 mass parts of glycidyl methacrylate, and 185 mass parts of toluene was heated at 70° C. while stirring in the nitrogen current. To the above mixture was added 1.2 mass part of 2,2'-azobisisobutyronitrile (abbreviated to AIBN), and the mixture was stirred for 6 hours. Further 1.0 mass part of AIBN was added and the solution was stirred at 75° C. for 4 hours. After being cooled to room temperature, the reaction solution was reprecipitated in 1.0 liter of methanol, the precipitate was collected and dried under reduced pressure, thereby 84 mass parts in yield of a product having Mw of $7\times10^4$ was obtained.

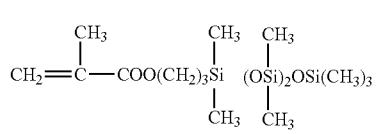

Monomer (S)

Block copolymer (BPS-1)

Synthesis Examples 2 to 4 of Block Copolymers (BPS):
Block Copolymers (BPS-2 to 4):

Each copolymer shown in Table 2 below was synthesized in the same manner as in the synthesis of block copolymer (BPS-1). The yield of each polymer was from 85 to 88 mass parts, and Mw was from $6 \times 10^4$ to $8 \times 10^4$.

TABLE 2

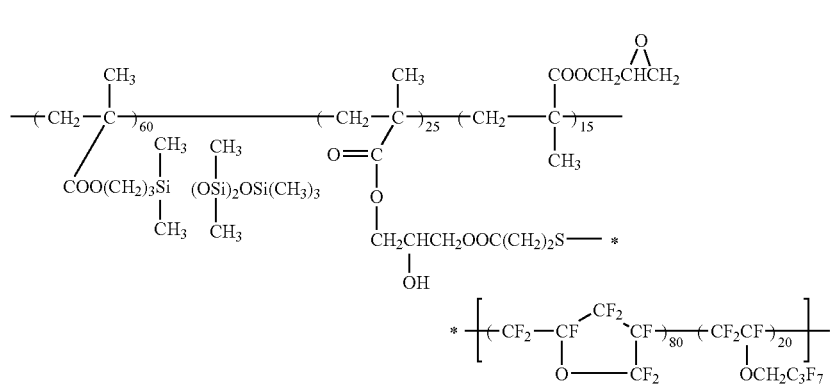

| Co-polymer (BPS) | —F— | —L— | —Y— | composition ratio (x/y/z) by mass |
|---|---|---|---|---|
| 2 BPS-2 | —(CF$_2$—CF—CF—CF$_2$)$_{85}$(CF$_2$—CF)$_{15}$ with O—CF$_2$—CF$_2$ ring, OC$_2$F$_3$; Mw $8 \times 10^2$ | —(CH$_2$)$_2$OOC(CH$_2$)$_2$C(CH$_3$)(CN)— | —COO(CH$_2$)$_2$NCO | 53/30/13 |
| 3 BPS-3 | CF$_3$ branch, —(CF—CF—CF)$_{90}$(CF$_2$—CF)$_{10}$ with F$_2$C—O—CF$_2$ ring, CF$_3$; Mw $8 \times 10^3$ | (CH$_2$)$_2$NHCOO(CH$_2$)$_4$S— | —COO(CH$_2$)$_2$OCOCH=CH$_2$ | 50/35/15 |
| 4 BPS-4 | F$_3$C, CF$_3$; —CF—CF— with F$_2$C—CF$_2$ and CF$_3$; Mw $1 \times 10^4$ | —(CH$_2$)$_2$OCC(CH$_2$)$_2$CONH(CH$_2$)$_2$S— | —COO(CH$_2$)$_2$OCOC(CH$_3$)=CH$_2$ | 60/25/15 |

EXAMPLES 1 AND 2 AND COMPARATIVE EXAMPLES 1 AND 2

Preparation of Hard Coat Layer Coating Solution (A):

A mixture comprising pentaerythritol pentaacrylate and dipentaerythritol hexaacrylate (DPHA (a trade name), manufactured by NIPPON KAYAKU CO., LTD.) (125 mass parts), and 125 mass parts of urethane acrylate oligomer (UV-6 300B (a trade name), manufactured by THE NIPPON SYNTHETIC CHEMICAL INDUSTRY CO., LTD.) were dissolved in 439 mass parts of modified industrial ethanol. A solution obtained by dissolving 7.5 mass parts of a photo-polymerization initiator (Irgacure 907 (trade name) manufactured by Ciba Geigy Japan Limited) and 5.0 mass parts of a photo-sensitizer (Kaya Cure DETX (trade name) manufactured by NIPPON KAYAKU CO., LTD.) in 49 mass parts of methyl ethyl ketone was added to the above-obtained solution. The mixture was stirred and filtered through a filter of 1 μm-meshes, thereby hard coat layer coating solution (A) was prepared.

Preparation of Middle Refractive Index Layer Coating Solution (A):

To 49.60 mass parts of the following shown titanium dioxide dispersion (A), 18.08 mass parts of polyfunctional acrylate DPHA, 0.920 mass parts of Irgacure 907, 0.307 mass parts of Kaya Cure DETX, 230.0 mass parts of methyl ethyl ketone and 500 mass parts of cyclohexanone were added and stirred. The mixture was filtered through a polypropylene filter having a pore diameter of 0.4 μm, thereby middle refractive index layer coating solution (A) was prepared.

Preparation of Titanium Dioxide Dispersion (A):

Thirty (30) mass parts of titanium dioxide fine particles having a core/shell structure (TTO-55B (trade name), shell material: 9 mass % of the total alumina particles, manufactured by Ishihara Sangyo Kaisha Ltd.), 4.5 mass parts of commercially available anionic monomer (PM-21 (trade name), manufactured by NIPPON KAYAKU CO., LTD.), 0.3 mass parts of commercially available cationic monomer (DMAEA (trade name), manufactured by KOHJIN Co., Ltd.), and 65.2 mass parts of cyclohexanone were dispersed by a sand grinder mill, thereby titanium dioxide dispersion (A) having a mass average particle size of 53 nm was prepared.

Preparation of High Refractive Index Layer Coating Solution (A):

To 110.0 mass parts of the above titanium dioxide dispersion (A), 6.29 mass parts of polyfunctional acrylate DPHA, 0.520 mass parts of Irgacure 907, 0.173 mass parts of Kaya Cure DETX, 230.0 mass parts of methyl ethyl ketone and 460.0 mass parts of cyclohexanone were added and stirred. The mixture was filtered through a polypropylene filter having a pore diameter of 0.4 μm, thereby high refractive index layer coating solution (A) was prepared.

Preparation of Low Refractive Index Layer Coating Solution (Ln-1):

A mixture comprising 5.4 mass parts of block copolymer (BPF-1) of the invention, 2.2 mass parts (as solids content) of colloidal silica MEK-ST (average particle size: from 10 to 20 nm, methyl ethyl ketone dispersion of solids content concentration of 30 mass %, manufactured by Nissan Chemical Industries, Ltd.), 1.1 mass parts (as solids content) of epoxy curing agent DEX314 (manufactured by Nagase Chemitex Corporation), 0.35 mass parts of paratoluene-sulfonic acid and 200 mass parts of methylethyl ketone were stirred. The mixture was filtered through a polypropylene filter having a pore diameter of 1 μm, thereby low refractive index layer coating solution (Ln-1) was prepared.

Preparation of Low Refractive Index Layer Coating Solution (Ln-2):

Low refractive index layer coating solution (Ln-2) was prepared in the same manner as in the preparation of low refractive index layer coating solution (Ln-1) except for using 5.4 mass parts of block copolymer (BPS-1) in place of 5.4 mass parts of block copolymer (BPF-1) used in the preparation of low refractive index layer coating solution (Ln-1).

EXAMPLE 1

Production of Anti-Reflection Film (F-1):

The coating surface of a triacetyl cellulose film (TD80UF, manufactured by Fuji Photo Film Co., Ltd.) having a thickness of 80 μm was destaticized with a Corona Destaticizer. The above-prepared hard coat layer coating solution (A) was coated thereon with a bar coater, dried at 90° C. and irradiated with ultraviolet rays to cure the coated layer, thereby a hard coat layer having a thickness of 6 μm was formed.

The above middle refractive index layer coating solution (A) was coated on the hard coat layer with a bar coater, dried at 60° C. and irradiated with ultraviolet rays to cure the coated layer, thereby a middle refractive index layer (a refractive index: 1.70, a layer thickness: 70 nm) was formed. High refractive index layer coating solution (A) was coated on the middle refractive index layer with a bar coater, dried at 60° C. and irradiated with ultraviolet rays to cure the coated layer, thereby a high refractive index layer (a refractive index: 1.95, a layer thickness: 75 nm) was formed. Low refractive index layer coating solution (Ln-1) was coated on the high refractive index layer with a bar coater in a dry thickness of 85 nm. The layer was dried for 1 minute after coating, heated at 120° C. for 10 minutes, and allowed to stand to cool to room temperature to form a low refractive index layer, thereby anti-reflection film (F-1) was produced.

EXAMPLE 2

Production of Anti-Reflection Film (F-2):

Anti-reflection film (F-2) was prepared in the same manner as in the preparation of anti-reflection film (F-1) except for using low refractive index layer coating solution (Ln-2) in place of low refractive index layer coating solution (Ln-1) in the preparation of anti-reflection film (F-1).

COMPARATIVE EXAMPLE 1

Anti-reflection film (FR-1) was produced in the same manner as in Example 1 except for using the following comparative coating solution (Ln-R1) in place of low refractive index layer coating solution (Ln-1).

Preparation of Comparative Low Refractive Index Layer Coating Solution (Ln-R1):

Coating solution (Ln-R1) was prepared in the same manner as in the preparation of coating solution (Ln-1) except for using 4.6 mass parts of perfluoroolefin copolymer (FP-1) used in Synthesis Example 1 of block copolymer (BPF) and 0.8 mass parts of monofunctional siloxane-containing oligomer (SO-1) used in the Synthesis Example 1 of block copolymer (BPF), in place of 5.4 mass parts of block copolymer (BPF-1) used in low refractive index layer coating solution (Ln-1).

COMPARATIVE EXAMPLE 2

Anti-reflection film (FR-2) was prepared in the same manner as in Example 1 except for using the following shown comparative coating solution (Ln-R2) in place of low refractive index layer coating solution (Ln-1).

Preparation of Low Refractive Index Layer Coating Solution (Ln-R2):

Comparative coating solution (Ln-R2) was prepared in the same manner as in the preparation of coating solution (Ln-1) except for using 5.4 mass parts of fluorine-containing copolymer (PR-1) for comparison shown below in place of 5.4 mass parts of block copolymer (BPF-1) used in the preparation of (Ln-1).

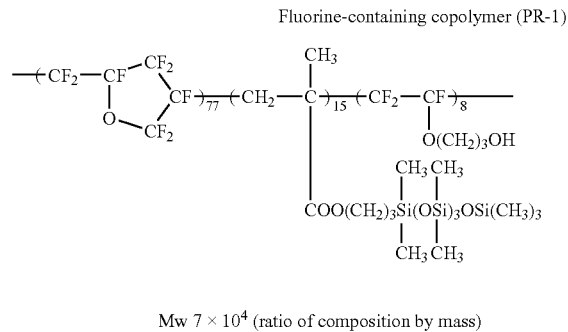

Fluorine-containing copolymer (PR-1)

Mw $7 \times 10^4$ (ratio of composition by mass)

COMPARATIVE EXAMPLE 3

Anti-reflection film (FR-3) was prepared in the same manner as in Example 2 except for using the following shown comparative coating solution (Ln-R3) in place of low refractive index layer coating solution (Ln-2).

Preparation of Low Refractive Index Layer Coating Solution (Ln-R3):

Comparative coating solution (Ln-R3) was prepared in the same manner as in the preparation of coating solution (Ln-2) except for using 5.4 mass parts of fluorine-containing copolymer (PR-2) for comparison shown below in place of 5.4 mass parts of block copolymer (BPF-1) used in the preparation of (Ln-2).

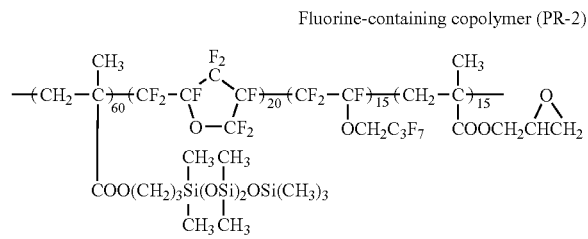

Fluorine-containing copolymer (PR-2)

Mw $5 \times 10^4$

Evaluation of Anti-Reflection Film:

Each film formed by coating the above-prepared four layers (Examples 1 and 2 and Comparative Examples 1 to 3) was evaluated as follows, and the results obtained are shown in Table 3 below.

(1) Average Reflectance

Spectral reflectance at incident angle of 5° was measured in wavelength range of from 380 to 780 nm by means of a spectrophotometer (manufactured by JASCO Corporation). Mirror average reflectance of from 450 to 650 nm was used with the result.

(2) Evaluation of Pencil Hardness

Each anti-reflection film was subjected to humidity conditioning at 25° C. 60% RH for 2 hours, and hardness was tested with a 3H pencil defined by JIS S6006, a load of 1 kg. The result was visually evaluated according to the following criteria.

o: Scratch was not observed at all by the evaluation of n=5.

Δ: One or two scratches were observed by the evaluation of n=5.

x: Three or more scratches were observed by the evaluation of n=5.

(3) Scratch Resistance Test

The surface of each film was rubbed ten times with steel wool #0000 and a load of 200 g. Generation of scratch was evaluated according to the following criteria.

o: Scratch was not generated at all.

Δ: Scratches were observed a little.

x: Scratches were generated conspicuously.

(4) Evaluation of Adhesion

Each anti-reflection film was subjected to humidity conditioning at 25° C. 60% RH for 2 hours. Eleven lines of notches were made in the transverse direction and machine direction respectively on the surface of the side having a high refractive index layer of each film to make 100 squares in total with a cutter knife. An adhesion test with a polyester adhesive tape (No. 31B manufactured by NITTO DENKO CORPORATION) was repeated five times at the same spot. Whether a square peeled or not was visually observed and evaluated according to the following four grades.

⊚: Even one of 100 squares did not peel at all.

o: Two or less of 100 squares peeled.

Δ: From three to ten of 100 squares peeled.

x: Ten or more of 100 squares peeled.

(5) Anti-Pollution

Fingerprints were adhered on the surface of a sample and the state when the fingerprints were wiped with BEMCOT (manufactured by Asahi Kasei Corporation) was observed and evaluated according to the following four grades.

⊚: Fingerprints were easily wiped off.

o: Fingerprints could be wiped off if rubbed tight.

Δ: Partially left without being wiped away.

x: Almost all were left without being wiped away.

TABLE 3

| Example No. | Anti-Reflection Film | Average Reflectance (%) | Pencil Hardness | Scratch Resistance | Adhesion | Anti-pollution |
|---|---|---|---|---|---|---|
| Example 1 | F-1 | 1.0 | ○ | ○ | ○ | ◎ |
| Example 2 | F-2 | 1.3 | ○ | ○ | ○ | ○ |
| Comparative Example 1 | FR-1 | 1.8 | X | Δ | X | ○ |
| Comparative Example 2 | FR-2 | 1.5 | Δ | Δ | X | Δ |
| Comparative Example 3 | FR-3 | 2.4 | Δ | Δ | Δ | X |

Anti-reflection films (F-1) and (F-2) according to the invention were excellent in each characteristic, i.e., film hardness and scratch resistance were sufficiently practicable. Oily marks such as fingerprints could be removed extremely easily.

On the other hand, in anti-reflection film (FR-1) in Comparative Example 1, which was obtained by blending perfluorocycloolefin copolymer (FP-1) of the starting material of block copolymer (BPF) of the invention and monofunctional siloxane-containing oligomer (SO-1) and curing, the polysiloxane component migrated to the surface and the film strength conspicuously lowered.

Further, anti-reflection films (FR-1) and (FR-2) in Comparative Examples 2 and 3 containing fluorine-containing random copolymers (PR-1) or (PR-2) respectively showed sufficient film strength but anti-pollution was insufficient.

It can be seen from the above results that the anti-reflection film formed by curing block copolymer (BP) of the invention alone shows excellent performances.

EXAMPLE 3

Preparation of Hard Coat Layer Coating Solution (B):

Polyfunctional acrylate DPHA (250 mass parts) was dissolved in 439 mass parts of a mixed solvent of 50/50 mass % of methyl ethyl ketone/cyclohexanone. A solution obtained by dissolving 7.5 mass parts of Irgacure 907 and 5.0 mass parts of Kaya Cure DETX in 49 mass parts of methyl ethyl ketone was added to the above-obtained solution. The refractive index of the film obtained by coating this mixed solution and curing with UV-ray irradiation was 1.53. Hard coat layer coating solution (B) was prepared by filtering the solution through a polypropylene filter having a pore diameter of 30 μm.

Preparation of Anti-Glare Hard Coat Layer Coating Solution (A):

Polyfunctional acrylate DPHA (91 mass parts), 199 mass parts of a hard coat layer coating solution containing dispersion of zirconium oxide super fine particles having a particle size of about 30 nm (De Solite Z-7041, manufactured by JSR Corporation), and 19 mass parts of a hard coat layer coating solution containing dispersion of zirconium oxide super fine particles having a particle size of about 30 nm (Desolite Z-7042, manufactured by JSR Co.) were dissolved in 52 mass parts of a mixed solvent of 54/46 mass % of methyl ethyl ketone/cyclohexanone. To the obtained solution was added 10 mass parts of Irgacure 907. The refractive index of the film obtained by coating this solution and curing with UV-ray irradiation was 1.61. Further, 29 mass parts of a dispersion solution obtained by adding 20 mass parts of crosslinkable polystyrene particles having a number average particle size of 1.99 μm and a standard deviation of particle size of 0.32 μm (16% of a number average particle size) (tradename: SX-200HS, air classified product of SX-200H, manufactured by The Soken Chemical & Engineering Co., Ltd.) to 80 mass parts of a mixed solvent of 54/46 mass % of methyl ethyl ketone/cyclohexanone, stirring and dispersing with a high speed disper at 5,000 rpm for 1 hour, and filtering through polypropylene filters having a pore diameter of 10 μm, 3 μm and 1 μm respectively (PPE-10, PPE-03 and PPE-01, manufactured Fuji Photo Film Co., Ltd.) (the ratio of the content of coarse particles having a particle size of 5.0 μm or larger: $0/1 \times 10^{10}$). After stirring, the solution was filtered through a polypropylene filter having a pore diameter of 30 μm, thereby anti-glare hard coat coating solution (A) was prepared.

Preparation of Low Refractive Index Layer Coating Solution (Ln-3):

A mixture comprising 6.5 mass parts of block copolymer (BPF-5), 2.2 mass parts (as solid content) of colloidal silica MEK-ST, 2.5 mass parts of isophorone diisocyanate, 0.02 mass parts of tetrabutoxy titanate, and 200 mass parts of methyl ethyl ketone was subjected to stirring, and filtered through a polypropylene filter having a pore diameter of 1 μm, thereby low refractive index layer coating solution (Ln-3) was prepared.

Production and Evaluation of Anti-Reflection Film (F-3):

The above hard coat layer coating solution (B) was coated with a bar coater on a triacetyl cellulose film TAC-TD80U, dried at 120° C., and the coated layer was cured by irradiation with ultraviolet rays at illumination intensity of 400 mW/cm$^2$ and irradiation dose of 300 mJ/cm$^2$ with an air cooled metal halide lamp of 160 W/cm (manufactured by EYEGRAPHICS Co., Ltd.) to obtain a hard coat layer having a thickness of 4 μm. Anti-glare layer coating solution (A) was coated with a bar coater on the hard coat layer, this hard coat layer was dried by the same condition as the above hard coat layer, and cured by irradiation with ultraviolet rays, thereby an anti-glare layer having a thickness of 1.5 μm was formed. The above low refractive index layer coating solution (Ln-3) was coated with a bar coater on the anti-glare layer, dried by air (1 minute), and the coated layer was further subjected to thermal crosslinking at 120° C. for 10 minutes, thereby a low refractive index layer having a thickness of 96 nm was formed.

The obtained anti-reflection film (F-3) was evaluated with respect to the test items in Example 1 and anti-glare as follows.

Evaluation of Anti-Glare:

A naked fluorescent lamp (8,000 cd/m²) without a louver was reflected on the anti-glare film formed and the degree of the fuzz of reflected image was evaluated according to the following criteria.

⊚: The outline of the fluorescent lamp could not be discerned at all.

o: The outline of the fluorescent lamp was discerned a little.

Δ: The fluorescent lamp was fuzzy but the outline could be discerned.

x: The fluorescent lamp was not almost fuzzy.

The results of evaluation showed almost the same performances as in Example 1 and anti-glare was graded (o).

EXAMPLE 4 AND COMPARATIVE EXAMPLE 4

Preparation of Hard Coat Layer Coating Solution (C):

Trimethylolpropane triacrylate (1,296 mass parts) and 809 mass parts of a 53.2 mass % methyl ethyl ketone solution containing polyglycidyl methacrylate (mass average molecular weight: $1.5 \times 10^4$) were dissolved in a mixed solvent comprising 943 mass parts of methyl ethyl ketone and 880 mass parts of cyclohexanone, then 48.1 mass parts of Irgacure 184 and 24 mass parts of di(t-butylphenyl) iodonium hexafluorophosphate were added to the above solution with stirring and the mixture was stirred for 10 minutes. The mixture was filtered through a polypropylene filter having a pore diameter of 0.5 μm, thereby hard coat coating solution (C) was prepared.

Preparation of Titanium Dioxide Dispersion (B):

Production of titanium dioxide: Cobalt-doped titanium dioxide fine particles were prepared according to the method disclosed in JP-A-5-330825 (from lines 3 to 17 in paragraph [0014]) except for changing iron (Fe) to cobalt (III) chloride. The doping amount of cobalt was Ti/Co (in a mass ratio) of 98.5/1.5. Rutile type crystal structure was observed in the prepared titanium dioxide, and the average particle size of primary particles was 40 nm, the specific surface area was 38 nm, and the specific surface area was 44 m²/g.

Dispersion (B) of titanium dioxide: The above oxide (100 mass parts), 20 mass parts of the following shown dispersant (D-1) and 360 mass parts of cyclohexanone were put in a Dyno mill and dispersed with zirconia beads having a particle size of 0.2 mm at 35 to 40° C. for 5 hours. Titanium dioxide dispersion (B) having an average particle size of 55 nm and free of coarse particles having a particle size of 300 nm was prepared.

Dispersant (D-1)

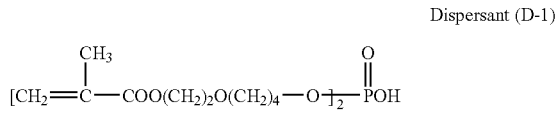

As a result of examining the dispersion after standing for 1 month, the particle size of the dispersion was the same as the state before aging, and particles having particle size of 300 nm or more were 0%.

Preparation of Middle Refractive Index Layer Coating Solution (B):

To 88.9 mass parts of oxide fine particle dispersion solution (PL-2), 58.4 mass parts of polyfunctional acrylate DPHA, 3.1 mass parts of Irgacure 907, 1.1 mass parts of Kaya Cure DETX, 482.4 mass parts of methyl ethyl ketone, and 1,869.8 mass parts of cyclohexanone were added and stirred. After performing ultrasonic dispersion for 10 minutes, the above dispersion solution was filtered through a polypropylene filter having a pore diameter of 0.4 μm, to thereby prepare middle refractive index layer coating solution (B).

Preparation of High Refractive Index Layer Coating Solution (B):

To 500 mass parts of oxide fine particle dispersion solution (PL-2), a mixed solvent comprising 204.4 mass parts of methyl ethyl ketone and 817.6 mass parts of cyclohexanone was added with stirring. Subsequently, a mixed solution comprising 37.5 mass parts of DPHA, 2.5 mass parts of Irgacure 907, 0.8 mass parts of Kaya Cure DETX, 19 mass parts of methyl ethyl ketone and 76.2 mass parts of cyclohexanone was added to the above solution and stirred. After performing ultrasonic dispersion for 10 minutes, the above dispersion solution was filtered through a polypropylene filter having a pore diameter of 0.4 μm, to thereby prepare high refractive index layer coating solution (B).

Preparation of Low Refractive Index Layer Coating Solution (Ln-4):

A mixture comprising 6.5 mass parts of block copolymer (BPF-4), 2.2 mass parts (as solid content) of colloidal silica MEK-ST, 2.5 mass parts of trimethylolpropane triacrylate, 0.02 mass parts of Irgacure 907, and 200 mass parts of methyl ethyl ketone was subjected to stirring, and filtered through a polypropylene filter having a pore diameter of 1 μm, thereby low refractive index layer coating solution (Ln-4) was prepared.

Production of Anti-Reflection Film (F-4):

The above hard coat layer coating solution (C) was coated with a gravure coater on the above triacetyl cellulose film (TD80UF), dried at 80° C., and the coated layer was cured by irradiation with ultraviolet rays with the dose of 500 mJ/cm² while purging nitrogen so that oxygen concentration became 1.0 vol % or less atmosphere to thereby form a hard coat layer having a thickness of 8 μm.

Middle refractive index layer coating solution (B) was coated with a gravure coater on the hard coat layer. After drying the middle refractive index layer coating solution at 100° C., the coated layer was cured by irradiation with ultraviolet rays with the dose of 600 mJ/cm² while purging nitrogen so that oxygen concentration became 1.0 vol % or less atmosphere to thereby form a middle refractive index layer (a refractive index: 1.67, a layer thickness: 70 nm).

High refractive index layer coating solution (B) was coated with a gravure coater on the middle refractive index layer. After drying the high refractive index layer coating solution at 100° C., the coated layer was cured by irradiation with ultraviolet rays with the dose of 600 mJ/cm² while purging nitrogen so that oxygen concentration became 1.0 vol % or less atmosphere to thereby form a high refractive index layer (a refractive index: 1.95, a layer thickness: 105 nm).

Low refractive index layer coating solution (Ln-4) was coated with a gravure coater on the high refractive index layer. After drying the high refractive index layer coating solution at 80° C., the coated layer was cured by irradiation with ultraviolet rays with the dose of 600 mJ/cm² while purging nitrogen so that oxygen concentration became 1.0 vol % or less atmosphere, heated at 120° C. for 10 minutes to thereby form a low refractive index layer (a refractive index: 1.43, a layer thickness: 86 nm). Thus, anti-reflection film (F-4) was produced.

Production of Comparative Anti-Reflection Film (FR-4):

Comparative anti-reflection film (FR-4) was produced in the same manner as in the preparation of anti-reflection film (F-4) except for using the same amount of titanium oxide particles in place of fine particles in high refractive index layer coating solution (B).

The obtained anti-reflection films (F-4 and FR-4) were evaluated with respect to the same performances in Example 1 and performances after weather proofness test as shown below.

Evaluation of Weather Proofness:

Weather proofness test was performed on the conditions of Sunshine Arc Lamp, 60% RH, 120 hours with Sunshine Weather Meter (manufactured by Suga Instruments Inc.).

Each test sample was evaluated in the same manner as in Example 1. The results obtained are shown in Table 4 below.

TABLE 4

| Example No. | Anti-Reflection Film | Anti-reflection Film after Weatherproof Test | | | |
|---|---|---|---|---|---|
| | | Reflectance | Pencil Hardness | Scratch Resistance | Adhesion | Anti-pollution |
| Example 4 | F-4 | 1.8% | ○ | ○ | ○ | ⊚ |
| Comparative Example 4 | FR-4 | Measurement Impossible (white turbidity occurred) | X | X | X | X |

The film in Example 4 showed almost the same performances as in Example 1, and the performances after forced weatherproof test hardly varied from the performances before the test. On the other hand, the performances of the film in Comparative Example 4 before the weatherproof test were equal to those in Example 4 but white turbidity occurred all over the surface of the sample after the weatherproof test and film strength and anti-pollution conspicuously deteriorated.

Thus, an anti-reflection film excellent in anti-reflection, mechanical characteristics of films and weather proofness can be obtained according to the present invention.

EXAMPLES 5 TO 12

Low refractive index layer coating solutions (Ln-5) to (Ln-12) were prepared in the same manner as in Example 1 except that block copolymer (BPF), curing agents and curing accelerators shown in Table 5 below were used in place of 5.4 mass parts of block copolymer (BPF-1), 1.1 mass parts of curing agent DEX314 and 0.35 mass parts of paratoluenesulfonic acid. And then each anti-reflection films (F-5) to (F-12) were produced in the same manner as in Example 1.

TABLE 5

| Ex. No. | Anti-Reflection Film | Low refractive Index Layer Coating Soln. (Ln) | Block Copolymer (BPF) | Curing Agent | Curing Accelerator |
|---|---|---|---|---|---|
| 5 | F-5 | Ln-5 | BPF-3 | Epoxy curing agent DEX314 1.1 mass parts | Paratoluenesulfonic acid 0.015 mass parts |
| 6 | F-6 | Ln-6 | BPF-2 | [epoxy structure] 1.6 mass parts | [sulfonium salt structure] •PF$_6^\ominus$ 0.015 mass parts |

TABLE 5-continued

| Ex. No. | Anti-Reflection Film | Low refractive Index Layer Coating Soln. (Ln) | Block Co-polymer (BPF) | Curing Agent | Curing Accelerator |
|---|---|---|---|---|---|
| 7 | F-7 | Ln-7 | BPF-6 | Trimethylolpropane triglycidyl ether 1.2 mass parts | 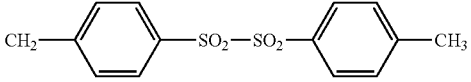 0.01 mass parts |
| 8 | F-8 | Ln-8 | BPF-7 | Isocyanate curing agent Takenate DHO (manufactured by Takeda Chemical Industries Ltd.) 1.4 mass parts | Tripropoxy aluminate 0.005 mass parts |
| 9 | F-9 | Ln-9 | BPF-8 | 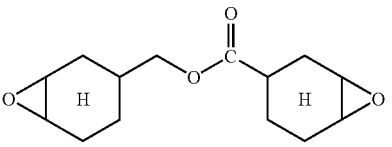 1.0 mass parts | 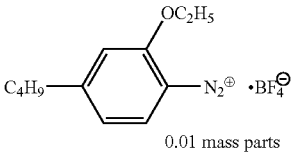 0.01 mass parts |
| 10 | F-10 | Ln-10 | BPF-2 | Trimethylolpropane 0.8 mass parts | Tetrabutoxy titanate 0.008 mass parts |
| 11 | F-11 | Ln-11 | BPF-3 | Trimethylolpropane triacrylate 1.1 mass parts | 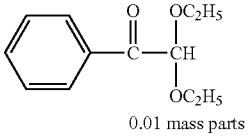 0.01 mass parts |
| 12 | F-12 | Ln-12 | BPF-4 | DPHA 1.0 mass part | Irgacure 907 0.01 mass parts |

Each film was evaluated in the same manner as in Example 1. Every film in Examples 5 to 12 showed the same excellent performances as in Example 1.

EXAMPLE 13

Anti-reflection film (F-13) was produced in the same manner as in Example 2 except for using the following low refractive index layer coating solution (Ln-13) in place of low refractive index layer coating solution (Ln-2) used in Example 2.

Preparation of Low Refractive Index Layer Coating Solution (Ln-13):

A mixture comprising 5.0 mass parts of block copolymer (BPF-9) shown below, 2.0 mass parts of colloidal silica MEK-ST, 2.5 mass parts of methyl trimethoxysilane, 0.01 mass parts of acetyl acetate Zr salt, and 150 mass parts of methyl ethyl ketone was stirred for 4 hours. And then the solution was filtered through a polypropylene filter having a pore diameter of 1 μm, thereby low refractive index layer coating solution (Ln-13) was prepared

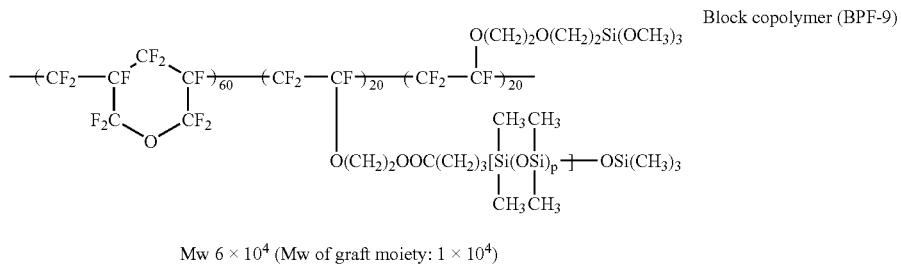

Mw $6 \times 10^4$ (Mw of graft moiety: $1 \times 10^4$)

The performances of anti-reflection film (F-13) obtained were evaluated in the same manner as in Example 1. The results showed the same performances as in Example 1.

EXAMPLE 14

Evaluation of Image Display Apparatus:

Each anti-glare anti-reflection film of the invention thus produced was mounted on an image display apparatus. Every image display apparatus showed superior performance excellent in anti-reflection property and visibility.

EXAMPLE 15

Production of Protective Film for Polarizing Plate:

In anti-reflection films produced in Examples 1 to 13, the surface of each transparent substrate opposite to the side having an anti-reflection film of the invention was subjected to saponification treatment by coating a saponification solution of an alkali solution comprising 57 mass parts of potassium hydroxide, 120 mass parts of propylene glycol, 535 mass parts of isopropyl alcohol, and 288 mass parts of water maintained at 40° C.

The alkali solution on the surface of each transparent substrate subjected to saponification treatment was thoroughly washed with water and sufficiently dried at 100° C. Thus, a protective film for a polarizing plate was produced.

Production of Polarizing Plate:

A polyvinyl alcohol film having a thickness of 75 μm (manufactured by KURARAY CO., LTD.) was soaked in an aqueous solution comprising 1,000 mass parts of water, 7 mass parts of iodine and 105 mass parts of potassium iodide for 5 minutes and iodine was adsorbed. Subsequently, the film was monoaxially stretched 4.4 times in the machine direction in a 4 mass % boric acid aqueous solution, and dried with maintaining stretch, thereby a polarizing film was obtained.

The saponification treated triacetyl cellulose surface of the anti-reflection film (the protective film for a polarizing plate) was adhered to one surface of the polarizing film with a polyvinyl alcohol adhesive. To the other surface of the polarizing film, a cellulose acylate film TD80UF which was similarly subjected to saponification treatment was adhered with the same polyvinyl alcohol adhesive.

Evaluation of Image Display Apparatus:

TN, STN, IPS, VA, OCB mode transparent, reflecting and semi-transparent liquid crystal displays equipped with the thus-produced polarizing plate of the invention were excellent in anti-reflection performance and extremely excellent in visibility.

EXAMPLE 16

Production of Polarizing Plate:

In an optical compensation film (wide view film SA-12B, manufactured by Fuji Photo Film Co., Ltd.), the surface of the side opposite to the side having the optical compensation layer was subjected to saponification treatment in the same manner as in Example 15.

The saponification treated triacetyl cellulose surface of the anti-reflection film (the protective film for a polarizing plate) prepared in Example 15 was adhered to one surface of the polarizing film with a polyvinyl alcohol adhesive. To the other surface of the polarizing film, the saponification treated triacetyl cellulose surface of the optical compensation film was adhered with the same polyvinyl alcohol adhesive.

Evaluation of Image Display Apparatus:

TN, STN, IPS, VA, OCB mode transparent, reflecting and semi-transparent liquid crystal displays equipped with the thus-produced polarizing plate of the invention were excellent in contrast in a bright room, the angle of visibility in both upward, downward and left side, right side directions was very wide, extremely excellent in anti-reflection performance, visibility and display grade as compared with a liquid crystal display installing a polarizing plate not using an optical compensation film.

The present invention can provide an anti-reflection film excellent in weather proofness (in particular, light fastness) inexpensively by mass production by manufacturing a high refractive index layer containing fine particles of oxides and/or compound oxides containing specific elements as described in this specification.

In addition, the anti-reflection film makes it possible to provide a polarizing plate and image display apparatus having the above-described characteristics.

A uniform film excellent in scratch resistance and an anti-pollution property can be obtained with the film-forming composition described in the specification of the invention.

The present invention can also provide an anti-reflection film excellent in an anti-reflection property, scratch resistance and an anti-pollution property, and a polarizing plate and an image display apparatus using the anti-reflection film.

The present invention can further provide an image display apparatus excellent in an anti-reflection property, an anti-pollution property, durability and waterproofness.

Still further, the present invention can provide a coating composition for an anti-pollution article excellent in an anti-pollution property, durability and scratch resistance, and an anti-pollution article.

The entire disclosure of each and every foreign patent application from which the benefit of foreign priority has been claimed in the present application is incorporated herein by reference, as if fully set forth.

What is claimed is:

1. An anti-reflection film comprising a low refractive index layer, wherein the low refractive index layer is formed by coating and curing a film-forming composition comprising:
a block copolymer comprising:
at least one polymer block [A] containing a repeating unit (F), the repeating unit (F) containing at least one of fluorine-containing alicyclic structures represented by formula (FI) and formula (FII);
at least one polymer block [B] containing a repeating unit (S), the repeating unit (S) containing at least one group selected from the siloxane structure groups represented by formula (SI); and
a repeating unit (H) having at least one reactive group capable of being involved in crosslinking reaction, the repeating unit (H) being in at least one of the polymer block [A] and the polymer block [B]; and
at least one of a curing agent and a curing accelerator;

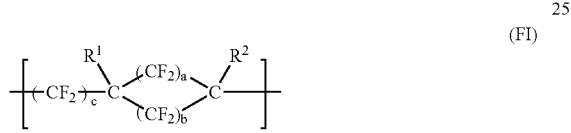
(FI)

wherein $R^1$ and $R^2$, which are the same or different, each represents a fluorine atom or a $-C_jF_{2j+1}$ group; j represents an integer of from 1 to 4; a represents 0 or 1; b represents an integer of from 2 to 5; and c represents 0 or 1;

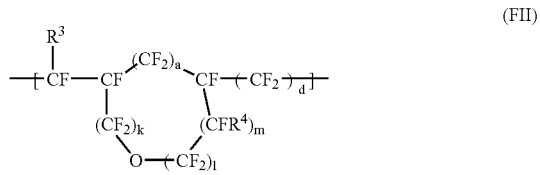
(FII)

wherein $R^3$ and $R^4$ each represents a fluorine atom or a $-CF_3$ group; a represents the same number as in formula (FI); d represents 0 or 1; k represents 0 or an integer of from 1 to 5; l represents 0 or an integer of from 1 to 4; m represents 0 or 1; and (k+l+m) is an integer of from 1 to 6;

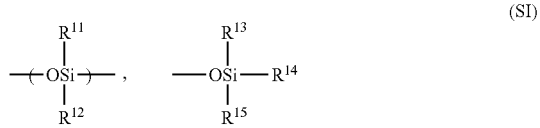
(SI)

wherein $R^{11}$, $R^{12}$, $R^{13}$, $R^{14}$ and $R^{15}$, which are the same or different, each represents an aliphatic group or an aromatic group.

2. The anti-reflection film according to claim 1, wherein the low refractive index layer contains inorganic compound fine particles having an average primary particle size of 3 to 50 nm and a refractive index of 1.5 or less.

3. The anti-reflection film according to claim 1, further comprising a transparent substrate.

4. The anti-reflection film according to claim 3, further comprising:
at least one high refractive index layer having a higher refractive index than that of the transparent substrate, said at least one high refractive index layer being between the low refractive index layer and the transparent substrate.

5. The anti-reflection film according to claim 4, wherein said at least one high refractive index layer comprises two layers having different refractive indexes and each of the two layers has a refractive index of 1.50 to 2.50.

6. The anti-reflection film according to claim 3, further comprising:
at least one anti-glare layer having a higher refractive index than that of the transparent substrate, said at least one anti-glare layer being between the low refractive index layer and the transparent substrate.

7. The anti-reflection film according to claim 4, further comprising a hard coat layer between the transparent substrate and said at least one high refractive index layer.

8. The anti-reflection film according to claim 6, further comprising a hard coat layer between the transparent substrate and said at least one anti-glare layer.

9. A polarizing plate comprising:
a polarizing film; and
the anti-reflection film according to claim 4 as a protective film on at least one side of the polarizing film.

10. A polarizing plate comprising:
a polarizing film;
an optical compensation film having an optical anisotropy as a protective film on one side of the polarizing film; and
the anti-reflection film according to claim 4 as a protective film on the other side of the polarizing film.

11. An image display apparatus comprising:
the anti-reflection film according to claim 3 which is on the side of an image display face of the image display apparatus.

12. An image display apparatus comprising:
the polarizing plate according to claim 9 which is on the side of an image display face of the image display apparatus.

13. A coating composition for an anti-pollution article, comprising a film-forming composition comprising:
a block copolymer comprising:
at least one polymer block [A] containing a repeating unit (F), the repeating unit (F) containing at least one of fluorine-containing alicyclic structures represented by formula (FI) and formula (FII);
at least one polymer block [B] containing a repeating unit (S), the repeating unit (S) containing at least one group selected from the siloxane structure groups represented by formula (SI); and
a repeating unit (H) having at least one reactive group capable of being involved in crosslinking reaction, the repeating unit (H) being in at least one of the polymer block [A] and the polymer block [B]; and
at least one of a curing agent and a curing accelerator;

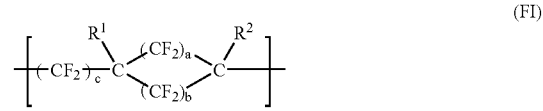
(FI)

wherein $R^1$ and $R^2$, which are the same or different, each represents a fluorine atom or a $-C_jF_{2j+1}$ group; j represents an integer of from 1 to 4; a represents 0 or 1; b represents an integer of from 2 to 5; and c represents 0 or 1;

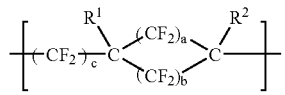
(FI)

wherein $R^3$ and $R^4$ each represents a fluorine atom or a $-CF_3$ group; a represents the same number as in formula (FI); d represents 0 or 1; k represents 0 or an integer of from 1 to 5; l represents 0 or an integer of from 1 to 4; m represents 0 or 1; and (k+1+m) is an integer of from 1 to 6;

$$-\!\!\left(\!OSi\!\right)\!\!\underset{R^{12}}{\overset{R^{11}}{|}}\!\!-, \quad -\underset{R^{15}}{\overset{R^{13}}{|}}\!\!Si\!-\!R^{14} \quad (SI)$$

wherein $R^{11}$, $R^{12}$, $R^{13}$, $R^{14}$ and $R^{15}$, which are the same or different, each represents an aliphatic group or an aromatic group.

14. An anti-pollution article having a film, the film being formed by coating and curing the coating composition according to claim 13.

* * * * *